(12) United States Patent
Kato et al.

(10) Patent No.: US 7,443,775 B2
(45) Date of Patent: Oct. 28, 2008

(54) METHOD FOR RECORDING DATA IN OPTICAL RECORDING MEDIUM, AND APPARATUS FOR RECORDING DATA IN OPTICAL RECORDING MEDIUM AND OPTICAL RECORDING MEDIUM

(75) Inventors: Tatsuya Kato, Tokyo (JP); Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 203 days.

(21) Appl. No.: 10/514,623

(22) PCT Filed: May 19, 2003

(86) PCT No.: PCT/JP03/06197

§ 371 (c)(1),
(2), (4) Date: Nov. 16, 2004

(87) PCT Pub. No.: WO03/098610

PCT Pub. Date: Nov. 27, 2003

(65) Prior Publication Data
US 2005/0201242 A1 Sep. 15, 2005

(30) Foreign Application Priority Data
May 17, 2002 (JP) ............................. 2002-142977

(51) Int. Cl.
*G11B 7/00* (2006.01)
(52) U.S. Cl. ................ 369/59.12; 369/275.1; 369/59.11
(58) Field of Classification Search ............... 369/59.11, 369/59.12, 275.1
See application file for complete search history.

(56) References Cited

U.S. PATENT DOCUMENTS

| 5,487,059 | A | * | 1/1996 | Saito et al. .................... 369/116 |
| 5,825,742 | A | * | 10/1998 | Tanaka et al. ............. 369/59.11 |
| 6,411,579 | B2 | * | 6/2002 | Nobukuni et al. ......... 369/59.12 |
| 6,442,119 | B1 | * | 8/2002 | Sunagawa ................. 369/47.53 |
| 6,548,137 | B2 | * | 4/2003 | Ito et al. ..................... 428/64.1 |

(Continued)

FOREIGN PATENT DOCUMENTS

JP 62204442 9/1987

(Continued)

*Primary Examiner*—Wayne Young
*Assistant Examiner*—Linh T Nguyen
(74) *Attorney, Agent, or Firm*—Seed IP Law Group PLLC

(57) ABSTRACT

It is an object of the present invention to provide a method for recording data in an optical recording medium which can form a recording mark having desired length and width in a write-once type optical recording medium. The method for recording data in an optical recording medium according to the present invention is constituted so as to project a laser beam whose power is modulated by a pulse train pattern onto an optical recording medium including a substrate, a first recording layer, a second recording layer and a light transmission layer 16 wherein a recording pulse of the pulse train pattern is divided into (n−1) divided pulses and the power of the laser beam is set to a recording power Pw at the peak of each of the divided pulses, set to a second bottom power Pb2 at a portion immediately after a last divided pulse and set to a first bottom power Pb1 at other intervals where Pb1 is higher than Pb2.

7 Claims, 10 Drawing Sheets

(a)

(b)

U.S. PATENT DOCUMENTS

| | | | |
|---|---|---|---|
| 2002/0064117 A1 * | 5/2002 | Kato et al. | 369/59.11 |
| 2002/0122365 A1 * | 9/2002 | Ueki | 369/47.53 |
| 2002/0167879 A1 * | 11/2002 | Ohno | 369/59.11 |
| 2003/0063530 A1 * | 4/2003 | Takehara et al. | 369/44.23 |
| 2004/0248036 A1 * | 12/2004 | Ohno et al. | 430/270.13 |
| 2005/0013229 A1 * | 1/2005 | Yokoi | 369/59.12 |
| 2005/0018589 A1 * | 1/2005 | Mizushima et al. | 369/275.2 |

FOREIGN PATENT DOCUMENTS

| | | |
|---|---|---|
| JP | 06203383 | 7/1994 |
| JP | 11232652 | 8/1999 |
| JP | 2000187842 | 7/2000 |

* cited by examiner

FIG. 2
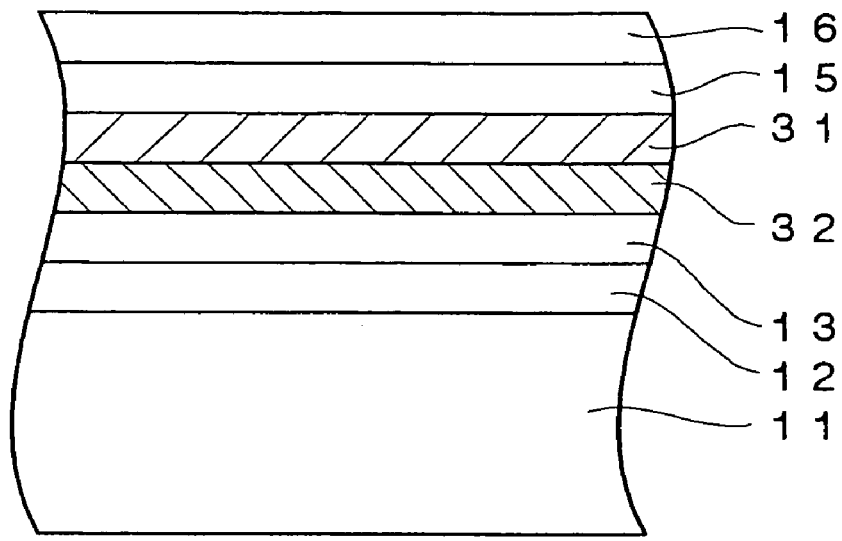
(a)
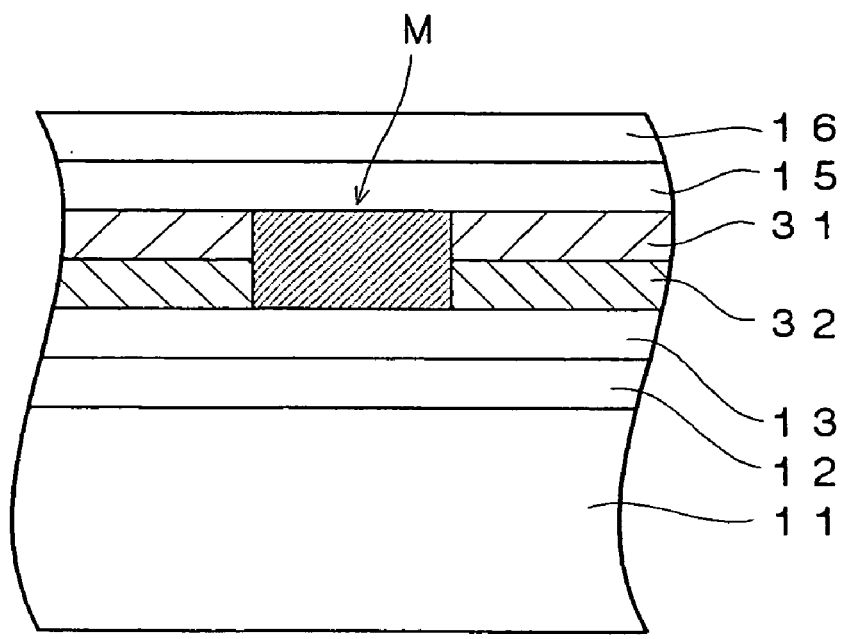
(b)

FIG. 3
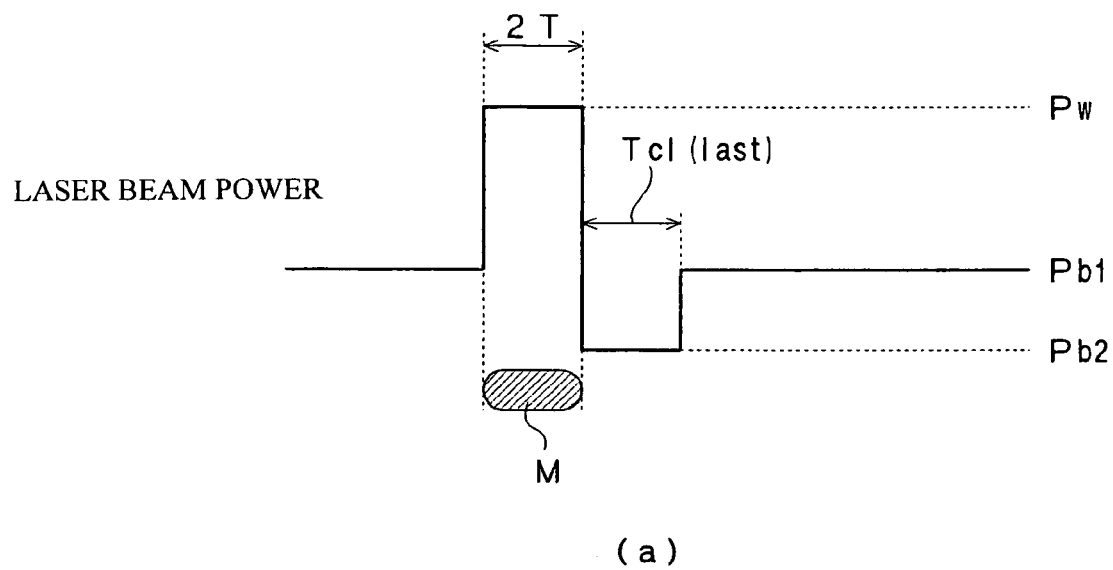
(a)
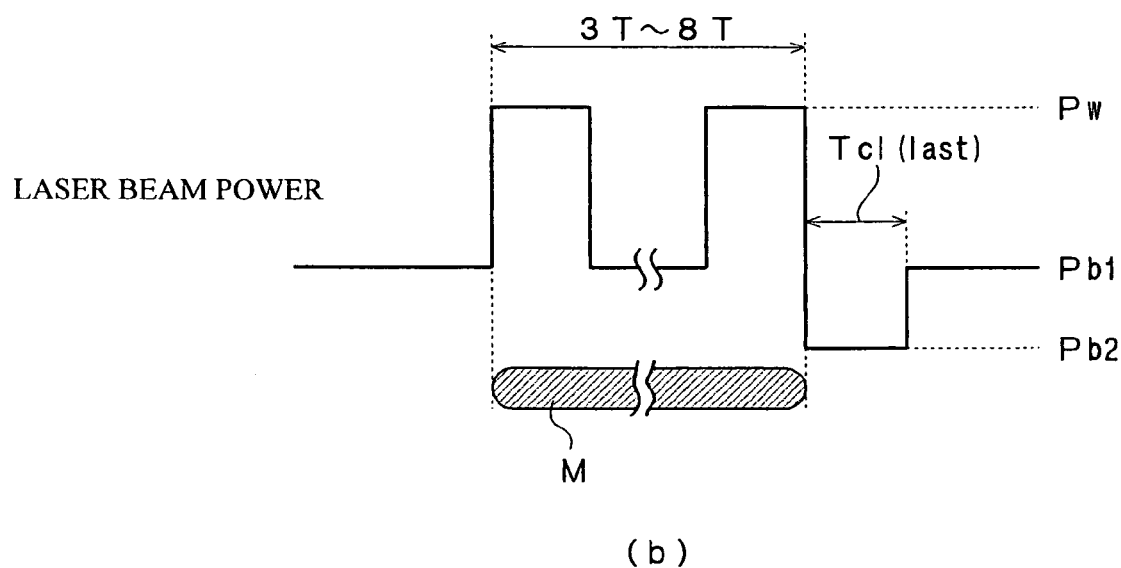
(b)

FIG. 4
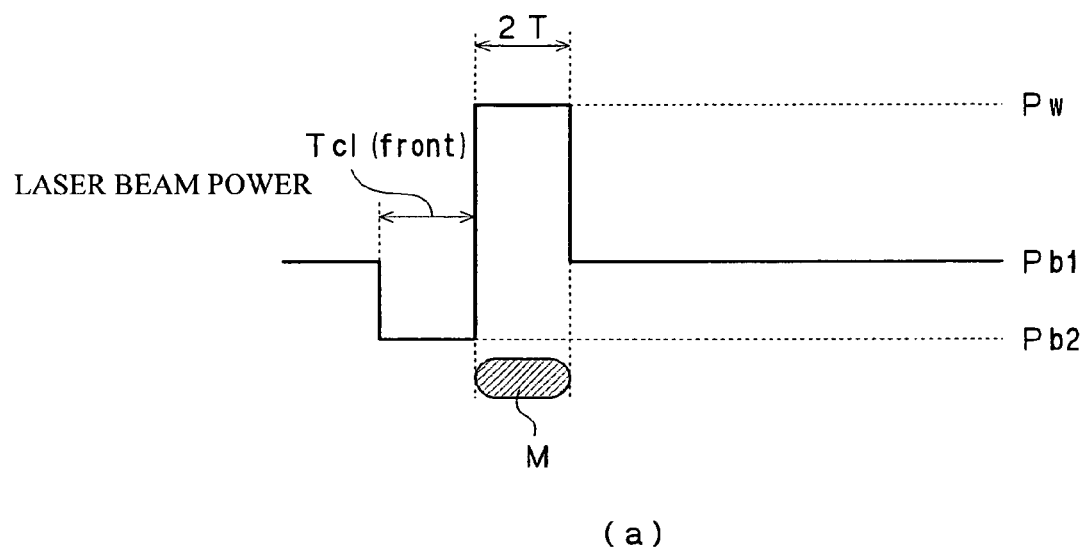
(a)
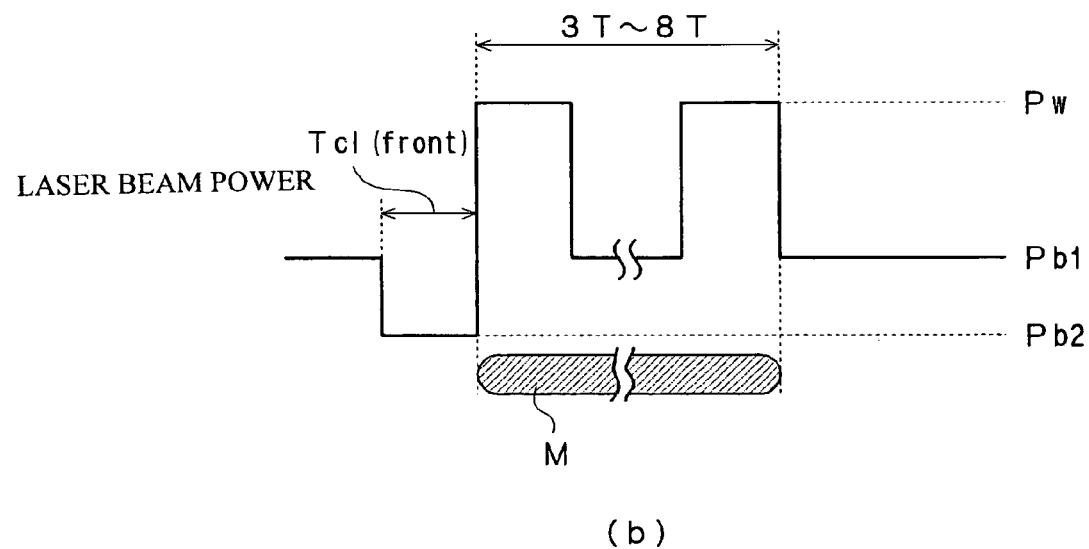
(b)

FIG. 5
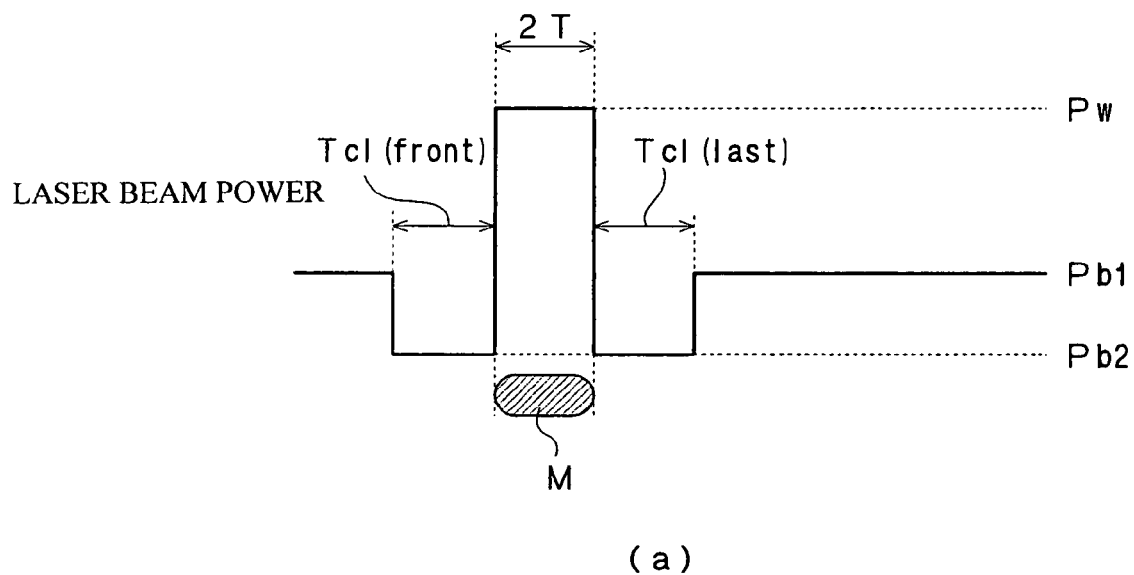
(a)
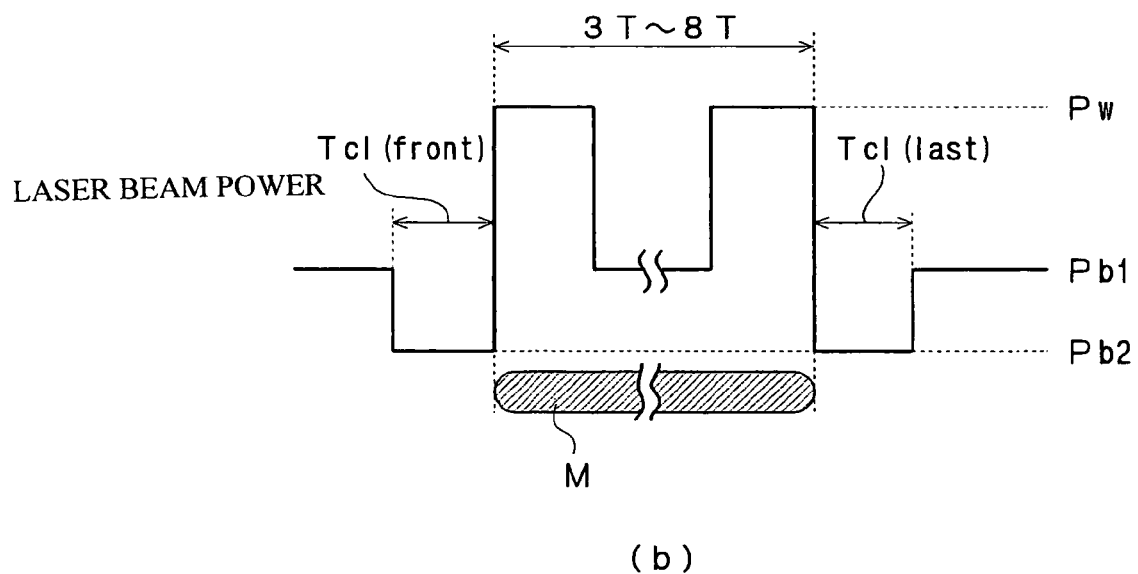
(b)

METHOD FOR RECORDING DATA IN OPTICAL RECORDING MEDIUM, AND APPARATUS FOR RECORDING DATA IN OPTICAL RECORDING MEDIUM AND OPTICAL RECORDING MEDIUM

BACKGROUND OF THE INVENTION

1. Field of the Invention

The present invention relates to a method for recording data in an optical recording medium, an apparatus for recording data in an optical recording medium and an optical recording medium, and particularly, to a method for recording data in a write-once type optical recording medium, an apparatus for recording data in a write-once type optical recording medium, and a write-once type optical recording medium.

2. Description of the Related Art

Optical recording media such as the CD, DVD and the like have been widely used as recording media for recording digital data. These optical recording media can be roughly classified into optical recording media such as the CD-ROM and the DVD-ROM that do not enable writing and rewriting of data (ROM type optical recording media), optical recording media such as the CD-R and DVD-R that enable writing but not rewriting of data (write-once type optical recording media), and optical recording media such as the CD-RW and DVD-RW that enable rewriting of data (data rewritable type optical recording media).

As well known in the art, data are generally recorded in a ROM type optical recording medium using pre-pits formed in a substrate in the manufacturing process thereof, while in a data rewritable type optical recording medium a phase change material is generally used as the material of the recording layer and data are recorded utilizing changes in an optical characteristic caused by phase change of the phase change material.

On the other hand, in a write-once type optical recording medium, an organic dye such as a cyanine dye, phthalocyanine dye or azo dye is generally used as the material of the recording layer and data are recorded utilizing changes in an optical characteristic caused by chemical change of the organic dye, or chemical change and physical change of the organic dye.

Further, there is known a write-once type recording medium formed by laminating two recording layers (See Japanese Patent Application Laid Open No. 62-204442, for example) and in this optical recording medium, data are recorded therein by projecting a laser beam thereon and mixing elements contained in the two recording layers to form a region whose optical characteristic differs from those of regions therearound.

In this specification, in the case where an optical recording medium includes a recording layer containing an organic dye, a region in which an organic dye chemically changes or chemically and physically changes upon being irradiated with a laser beam is referred to as "a recording mark" and in the case where an optical recording medium includes two recording layers each containing an inorganic element as a primary component, a region in which the inorganic elements contained in the two recording layers as a primary component are mixed upon being irradiated with a laser beam is referred to as "a recording mark".

An optimum method for modulating the power of a laser beam projected onto an optical recording medium for recording data therein is generally called "a pulse train pattern" or "recording strategy".

FIG. 10 is a diagram showing a typical pulse train pattern used for recording data in a CD-R including a recording layer containing an organic dye and shows a pulse train pattern for recording 3T to 11T signals in the EFM Modulation Code.

As shown in FIG. 10, in the case where data are to be recorded in a CD-R, a recording pulse having a width corresponding to the length of a recording mark M to be formed is generally employed (See Japanese Patent Application Laid Open No. 2000-187842, for example).

More specifically, the power of a laser beam is fixed to a bottom power Pb when the laser beam is projected onto a blank region in which no recording mark M is formed and fixed to a recording power Pw when the laser beam is projected onto a region in which a recording mark M is to be formed. As a result, an organic dye contained in a recording layer is decomposed or degraded at a region in which a recording mark M is to be formed and the region is physically deformed, thereby forming a recording mark M therein. Here, the ratio of the shortest blank region interval (3T) to the linear recording velocity (shortest blank region interval/linear recording velocity) is about 700 nsec at a 1× linear recording velocity of a CD-R.

FIG. 11 is a diagram showing a typical pulse train pattern used for recording data in a DVD-R including a recording layer containing an organic dye and shows a pulse train pattern for recording a 7T signal in the 8/16 Modulation Code.

Since data are recorded in a DVD-R at a higher linear recording velocity than when recording data in a CD-R, unlike the case of recording data in a CD-R, it is difficult to form a recording mark having a good shape using a recording pulse having a width corresponding to the length of the recording mark M to be formed.

Therefore, data are recorded in a DVD-R using a pulse train in which, as shown in FIG. 11, the recording pulse is divided into a number of divided pulses corresponding to the length of the recording mark M to be formed.

More specifically, in the case of recording an nT signal where n is an integer equal to or larger than 3 and equal to or smaller than 11 or 14 in the 8/16 Modulation Code, (n−2) divided pulses are employed and the power of the laser beam is set to a recording power Pw at the peak of each of the divided pulses and set to a bottom power Pb at the other portions of the pulse. In this specification, the thus constituted pulse train pattern is referred to as "a basic pulse train pattern". Here, the ratio of the shortest blank region interval (3T) to the linear recording velocity (shortest blank region interval/linear recording velocity) is about 115 nsec at a 1× linear recording velocity of a DVD-R.

However, in a study done by the inventors of the present invention, it was found that as the ratio of the shortest blank region interval to the linear recording velocity (shortest blank region interval/linear recording velocity) decreased, when the basic pulse train pattern was employed for forming a short recording mark M, the edge portion of the recording mark M on the downstream side thereof with respect to the moving direction of the laser beam (hereinafter referred to as a "rear edge portion of a recording mark M") tended to shift toward the moving direction of the laser beam, whereby the recording mark M became longer than the desired length and jitter of the reproduced signal became worse.

It is found that this phenomenon becomes pronounced in the case where the ratio of the shortest blank region interval (3T) to the linear recording velocity (shortest blank region interval/linear recording velocity) is equal to or smaller than 40 nsec and that in the case where the ratio of the shortest blank region interval (3T) to the linear recording velocity (shortest blank region interval/linear recording velocity) is further smaller and equal to or smaller than 20 nsec, the edge portion of a small recording mark M on the upstream side thereof with respect to the moving direction of the laser beam (hereinafter referred to as a "front edge portion of the recording mark M") also tends to be shifted toward the direction opposite to the moving direction of the laser beam, whereby the recording mark M becomes much longer than the desired length and jitter of the reproduced signal becomes still worse.

It is reasonable to assume that the reason why the rear edge portion of a recording mark is shifted toward the moving direction of the laser beam is because the recording layer is physically and/or chemically changed by heat generated by the laser beam having the recording power Pw projected thereonto for forming the recording mark even at a region downstream of the rear edge portion of the recording mark with respect to the moving direction of the laser beam. On the other hand, it can be assumed that the reason why the front edge portion of a recording mark is shifted to toward the direction opposite to the moving direction of the laser beam is because the temperature of a track is increased by thermal interference between neighboring recording marks, whereby the temperature of a region irradiated with the laser beam having the recording power Pw projected thereonto for forming the recording mark becomes too high.

In the case where the length of a recording mark becomes longer than a predetermined length, since jitter of the reproduced signal becomes markedly worse, it is necessary to prevent a recording mark from becoming longer than a predetermined length.

It might be considered possible to prevent a recording mark from becoming longer than a predetermined length by lowering the recording power Pw of the laser beam, thereby decreasing the amount of heat applied to the recording layer when the recording mark is formed.

However, in the case where the recording power Pw of the laser beam is lowered, the width of a recording mark becomes thin and the C/N ratio (carrier/noise ratio) of the signal is therefore lowered.

Another solution that might be considered is to shorten the period during which the power of the laser beam is set to the recording power Pw, namely, the width of the pulse to lower the total amount of heat applied to the recording layer when a recording mark is to be formed. However, since the modulation rate of the power of a laser beam has limitations, the pulse width of the laser beam sometimes cannot be set to the desired width in the case where the linear recording velocity is particularly high.

Thus it was found that in the case where the basic pulse train pattern is employed, it becomes increasingly difficult to obtain a signal having good signal characteristics as the ratio of the shortest blank region interval to the linear recording velocity (shortest blank region interval/linear recording velocity) decreases.

The above mentioned problems are particularly pronounced in a write-once type optical recording medium in which a recording mark is formed by projecting a laser beam thereonto to generate heat and mixing elements contained in a plurality of recording layers by the heat.

On the other hand, a next-generation type optical recording medium that offers improved recording density and has an extremely high data transfer rate has been recently proposed.

In such a next-generation type optical recording medium, the achievement of increased recording capacity and extremely high data transfer rate inevitably requires the diameter of the laser beam spot used to record and reproduce data to be reduced to a very small size.

In order to reduce the laser beam spot diameter, it is necessary to increase the numerical aperture of the objective lens for condensing the laser beam to 0.7 or more, for example, to about 0.85, and to shorten the wavelength of the laser beam to 450 nm or less, for example, to about 400 nm.

In addition, since data are recorded at an extremely high linear recording velocity in the next-generation type optical recording medium, it is required to increase the recording power Pw of a laser beam. However, since a semiconductor laser device having high output is expensive and the service life of a semiconductor laser device decreases as the recording power Pw of the laser beam is set higher, it is preferable to record data using a laser beam whose recording power Pw is as low as possible.

In order to record data in a next-generation type optical recording medium using a laser beam whose recording power Pw is as low as possible, it is effective to set the bottom power Pb of the laser beam high so as to augment the heating of the recording layer by the laser beam having the recording power Pw.

However, if the bottom power Pb of the laser beam is set high, the rear edge portion and front edge portion of a recording mark are shifted more greatly and the recording layer is sometimes physically and/or chemically changed even at a blank region, whereby data cannot be recorded therein.

BRIEF SUMMARY OF THE INVENTION

It is therefore an object of the present invention to provide a method for recording data in an optical recording medium which can form a recording mark having desired length and width in a write-once type optical recording medium.

It is another object of the present invention to provide a method for recording data in an optical recording medium which can form a recording mark having desired length and width in a write-once type optical recording medium even in the case where the ratio of the shortest blank region interval to the linear recording velocity is small.

It is a further object of the present invention to provide a method for recording data in an optical recording medium which can form a recording mark having desired length and width in a write-once type optical recording medium using a laser beam whose recording power is set low.

It is a further object of the present invention to provide a method for recording data in an optical recording medium which can form a recording mark having desired length and width in a write-once type optical recording medium including two or more recording layers.

It is a further object of the present invention to provide an apparatus for recording data in an optical recording medium which can form a recording mark having desired length and width in a write-once type optical recording medium.

It is a further object of the present invention to provide an apparatus for recording data in an optical recording medium which can form a recording mark having desired length and width in a write-once type optical recording medium even in the case where the ratio of the shortest blank region interval to the linear recording velocity is small.

It is a further object of the present invention to provide an apparatus for recording data in an optical recording medium which can form a recording mark having desired length and width in a write-once type optical recording medium using a laser beam whose recording power is set low.

It is a further object of the present invention to provide an apparatus for recording data in an optical recording medium which can form a recording mark having desired length and width in a write-once type optical recording medium including two or more recording layers.

It is a further object of the present invention to provide a write-once type optical recording medium in which a recording mark having desired length and width can be formed.

It is a further object of the present invention to provide a write-once type optical recording medium in which a recording mark having desired length and width can be formed even in the case where the ratio of the shortest blank region interval to the linear recording velocity is small.

It is a further object of the present invention to provide a write-once type optical recording medium in which a recording mark having desired length and width can be formed using a laser beam whose recording power is set low.

It is a further object of the present invention to provide a write-once type optical recording medium in which a recording mark having desired length and width can be formed including two or more recording layers.

The inventors of the present invention vigorously pursued a study for accomplishing the above objects and, as a result, made the discovery that when a recording mark was to be formed in an optical recording medium by projecting a laser beam whose power was modulated by a pulse train pattern including at least a pulse whose level was set to a level corresponding to a recording power and a pulse whose level was set to a level corresponding to a first bottom power, if the power of the laser beam was modulated by the pulse train pattern further including a pulse whose level was set to a level corresponding to a second bottom power lower than the first bottom power on at least one of front and rear sides of the pulse whose level was set to the level corresponding to the recording power, it was possible to form a recording mark having desired length and width and prevent jitter of a signal from becoming worse and the C/N ratio thereof from being lowered.

Therefore, the above objects of the present invention can be accomplished by a method for recording data in an optical recording medium wherein data are recorded in a write-once type optical recording medium comprising a substrate and at least one recording layer formed on the substrate by projecting a laser beam whose power is modulated by a pulse train pattern including at least a pulse whose level is set to a level corresponding to a recording power and a pulse whose level is set to a level corresponding to a first bottom power onto the at least one recording layer and forming at least two recording marks in the at least one recording layer, the method for recording data in an optical recording medium comprising a step of modulating the power of the laser beam by the pulse train pattern further including a pulse whose level is set to a level corresponding to a second bottom power lower than the first bottom power on at least one of front and rear sides of the pulse whose level is set to the level corresponding to the recording power.

In this specification, in the case where an optical recording medium includes a recording layer containing an organic dye, a region in which the organic dye chemically changes or chemically and physically changes upon being irradiated with a laser beam is referred to as a "recording mark" and in the case where an optical recording medium includes two recording layers each containing an inorganic element as a primary component, a region in which the inorganic elements contained in the two recording layers as a primary component are mixed upon being irradiated with a laser beam is referred to as a "recording mark".

According to the present invention, since the power of a laser beam is modulated by the pulse train pattern further including a pulse whose level is set to a level corresponding to a second bottom power lower than the first bottom power on at least one of front and rear sides of the pulse whose level is set to the level corresponding to the recording power, in the case where the pulse train pattern includes a pulse whose level is set to a level corresponding to a second bottom power lower than the first bottom power on the front side of the pulse whose level is set to the level corresponding to the recording power, the front edge portion of each of the recording marks heated by thermal interference of neighboring recording marks can be effectively cooled. Therefore, since it is possible to prevent a region of the recording layer upstream of the front edge portion of the recording mark with respect to the moving direction of the laser beam from being chemically or chemically and physically changed, it is possible to effectively prevent the front edge portion of the recording mark from being shifted and jitter of a signal from becoming worse.

Further, according to the present invention, in the case where the pulse train pattern further includes a pulse whose level is set to a level corresponding to a second bottom power lower than the first bottom power on the rear side of the pulse whose level is set to the level corresponding to the recording power, the rear edge portion of the recording mark heated by the laser beam can be effectively cooled and since it is possible to effectively prevent a region of the recording layer downstream of the rear edge portion of the recording mark with respect to the moving direction of the laser beam from being chemically or chemically and physically changed, it is possible to effectively prevent the rear edge portion of the recording mark from being shifted and jitter of a signal from becoming worse.

Furthermore, according to the present invention, in the case where the pulse train pattern further includes pulses whose levels are set to a level corresponding to a second bottom power lower than the first bottom power on both of the front and rear sides of the pulse whose level is set to the level corresponding to the recording power, it is possible to effectively prevent the front and rear edge portions of the recording mark from being shifted and jitter of a signal from becoming worse.

Moreover, in a study done by the inventors of the present invention, it was found that in the case where data were recorded by modulating a laser beam using the pulse train pattern further including a pulse whose level was set to a level corresponding to a second bottom power lower than the first bottom power on at least one of front and rear sides of the pulse whose level was set to the level corresponding to the recording power, even when data were recorded using a laser beam whose first bottom power was set high and recording power was set low, it was possible to effectively prevent a C/N ratio of a signal from being lowered.

In a preferred aspect of the present invention, the optical recording medium further comprises a light transmission layer, and a first recording layer and a second recording layer formed between the substrate and the light transmission layer, and is constituted so that the at least two recording marks are formed by projecting the laser beam thereonto, thereby mixing an element contained in the first recording layer as a primary component and an element contained in the second recording layer as a primary component.

In a further preferred aspect of the present invention, the second recording layer is formed so as to be in contact with the first recording layer.

In a preferred aspect of the present invention, the at least two recording marks are formed by setting a ratio of the shortest blank region interval to a linear recording velocity to be equal to or smaller than 40 nsec.

In a further preferred aspect of the present invention, the at least two recording marks are formed by setting a ratio of the shortest blank region interval to a linear recording velocity to be equal to or smaller than 20 nsec.

In a preferred aspect of the present invention, the pulse whose level is set to a level corresponding to the recording level is constituted by divided pulses of a number corresponding to a length of the recording mark.

In a further preferred aspect of the present invention, the power of the laser beam is set to the first bottom power between neighboring divided pulses.

In a preferred aspect of the present invention, data are recorded in the optical recording medium by projecting a laser beam having a wavelength equal to or shorter than 450 nm thereonto.

In a preferred aspect of the present invention, data are recorded in the optical recording medium by employing an objective lens and a laser beam whose numerical aperture NA and wavelength $\lambda$ satisfy $\lambda/NA \leq 640$ nm, and projecting the laser beam onto the optical recording medium via the objective lens.

The above objects of the present invention can be also accomplished by an apparatus for recording data in an optical recording medium, which comprises a laser beam projecting means for projecting a laser beam whose power is modulated by a pulse train pattern including at least a pulse whose level is set to a level corresponding to a recording power and a pulse whose level is set to a level corresponding to a first bottom power onto a write-once type recording medium comprising a substrate and at least one recording layer formed on the substrate, the laser beam projecting means being constituted so as to modulate the power of the laser beam by the pulse train pattern further including a pulse whose level is set to a level corresponding to a second bottom power lower than the first bottom power on at least one of front and rear sides of the pulse whose level is set to the level corresponding to the recording power.

The above objects of the present invention can be also accomplished by a write-once type optical recording medium comprising a substrate and at least one recording layer formed on the substrate and constituted so that data are recorded therein by projecting a laser beam whose power is modulated by a pulse train pattern including at least a pulse whose level is set to a level corresponding to a recording power and a pulse whose level is set to a level corresponding to a first bottom power thereonto and forming at least two recording marks in the at least one recording layer, the optical recording medium being recorded with data for setting recording conditions required for modulating the power of the laser beam in accordance with the pulse train pattern further including a pulse whose level is set to a level corresponding to a second bottom power lower than the first bottom power on at least one of front and rear sides of the pulse whose level is set to the level corresponding to the recording power.

According to the present invention, since the optical recording medium is recorded with data for setting recording conditions required for modulating the power of the laser beam in accordance with the pulse train pattern further including a pulse whose level is set to a level corresponding to a second bottom power lower than the first bottom power on at least one of front and rear sides of the pulse whose level is set to the level corresponding to the recording power, when data are to be recorded in the optical recording medium by projecting a laser beam thereonto, the power of the laser beam can be modulated so that recording marks having desired length and width can be formed and it is therefore possible to prevent jitter of a signal from becoming worse and a C/N ratio thereof from being lowered.

In a preferred aspect of the present invention, the optical recording medium further comprises a light transmission layer, and a first recording layer and a second recording layer formed between the substrate and the light transmission layer, and is constituted so that the at least two recording marks are formed by projecting the laser beam thereonto, thereby mixing an element contained in the first recording layer as a primary component and an element contained in the second recording layer as a primary component.

In a further preferred aspect of the present invention, the second recording layer is formed so as to be in contact with the first recording layer.

In the present invention, it is preferable for the first recording layer and the second recording layer to contain different elements as a primary component and for each of them to contain an element selected from a group consisting of Al, Si, Ge, C, Sn, Au, Zn, Cu, B, Mg, Ti, Mn, Fe, Ga, Zr, Ag and Pt as a primary component.

In a preferred aspect of the present invention, the first recording layer contains an element selected from a group consisting of Si, Ge, Sn, Mg, In, Zn, Bi and Al as a primary component, and the second recording layer contains Cu as a primary component.

In the present invention, in the case where the first recording layer contains an element selected from a group consisting of Si, Ge, Sn, Mg, In, Zn, Bi and Al as a primary component, and the second recording layer contains Cu as a primary component, the optical recording medium may include one or more recording layers containing an element selected from the group consisting of Si, Ge, Sn, Mg, In, Zn, Bi and Al as a primary component or one or more recording layers containing Cu as a primary element, in addition to the first recording layer and the second recording layer.

In the present invention, it is more preferable for the first recording layer to contain an element selected from a group consisting of Ge, Si, Mg, Al and Sn as a primary component.

In the present invention, in the case where the first recording layer contains an element selected from a group consisting of Si, Ge, Sn, Mg, In, Zn, Bi and Al as a primary component, and the second recording layer contains Cu as a primary component, it is preferable that at least one kind of an element selected from the group consisting of Al, Si, Zn, Mg, Au, Sn, Ge, Ag, P, Cr, Fe and Ti is added to the second recording layer and it is more preferable that at least one kind of an element selected from the group consisting of Al, Zn, Sn and Au is added to the second recording layer.

In another preferred aspect of the present invention, the first recording layer contains an element selected from a group consisting of Si, Ge, C, Sn, Zn and Cu as a primary component and the second recording layer contains Al as a primary component.

In the present invention in the case where the first recording layer contains an element selected from a group consisting of Si, Ge, C, Sn, Zn and Cu as a primary component and the second recording layer contains Al as a primary component, the optical recording medium may include one or more recording layer containing an element selected from the group consisting of Si, Ge, C, Sn, Zn and Cu as a primary component or one or more recording layer containing Al as a primary component, in addition to the first recording layer and the second recording layer.

In the present invention in the case where the first recording layer contains an element selected from a group consisting of Si, Ge, C, Sn, Zn and Cu as a primary component and the second recording layer contains Al as a primary component, it is preferable that at least one kind of an element selected from the group consisting of Mg, Au, Ti and Cu is added to the second recording layer.

In the present invention in the case where the first recording layer contains an element selected from a group consisting of Si, Ge, C, Sn, Zn and Cu as a primary component and the second recording layer contains Al as a primary component, the first recording layer and the second recording layer are preferably formed so that the total thickness thereof is 2 nm to 40 nm, more preferably, 2 nm to 30 nm, most preferably, 2 nm to 20 nm.

In a further preferred aspect of the present invention, the first recording layer contains an element selected from a group consisting of Si, Ge, C and Al as a primary component, the second recording layer contains Zn as a primary component and the first recording layer and the second recording layer are formed so that the total thickness thereof is equal to or thinner than 30 nm.

In the present invention, in the case where the first recording layer contains an element selected from a group consisting of Si, Ge, C and Al as a primary component and the second recording layer contains Zn as a primary component, the optical recording medium may include one or more recording layer containing an element selected from the group consisting of Si, Ge, C and Al as a primary component or one or more recording layer containing Zn as a primary component.

In the present invention, in the case where the first recording layer contains an element selected from a group consisting of Si, Ge, C and Al as a primary component and the second recording layer contains Zn as a primary component, it is preferable for the first recording layer to contain an element selected from a group consisting of Si, Ge and C as a primary component.

In the present invention, in the case where the first recording layer contains an element selected from a group consisting of Si, Ge, C and Al as a primary component and the second recording layer contains Zn as a primary component, the first recording layer and the second recording layer are preferably formed so that the total thickness thereof is 2 nm to 30 nm, more preferably, 2 nm to 24 nm, most preferably, 2 nm to 12 nm.

In the present invention, in the case where the first recording layer contains an element selected from a group consisting of Si, Ge, C and Al as a primary component and the second recording layer contains Zn as a primary component, it is preferable that at least one kind of an element selected from the group consisting of Mg, Cu and Al I added to the second recording layer.

In a preferred aspect of the present invention, the light transmission layer is formed so as to have a thickness of 10 nm to 300 nm.

The above and other objects and features of the present invention will become apparent from the following description made with reference to the accompanying drawings.

BRIEF DESCRIPTION OF THE DRAWINGS

FIG. 2(a) is a schematic enlarged cross-sectional view of the optical recording medium shown in FIG. 1 and FIG. 2(b) is a schematic enlarged cross-sectional view showing an optical recording medium after data have been recorded therein.

FIG. 3 is a set of diagrams showing a first pulse train pattern in the case where the 1.7RLL Modulation Code is employed, wherein FIG. 3(a) shows a pulse train pattern when a 2T signal is recorded and FIG. 3(b) shows a pulse train pattern when one of a 3T signal to an 8T signal is recorded.

FIG. 4 is a set of diagrams showing a first pulse train pattern in the case where the 1.7RLL Modulation Code is employed, wherein FIG. 4(a) shows a pulse train pattern when a 2T signal is recorded and FIG. 4(b) shows a pulse train pattern when one of a 3T signal to an 8T signal is recorded.

FIG. 5 is a set of diagrams showing a first pulse train pattern in the case where the 1.7RLL Modulation Code is employed, wherein FIG. 5(a) shows a pulse train pattern when a 2T signal is recorded and FIG. 5(b) shows a pulse train pattern when one of a 3T signal to an 8T signal is recorded.

DETAILED DESCRIPTION OF THE INVENTION

Preferred embodiments of the present invention will now be described with reference to accompanying drawings.

Figure 1:
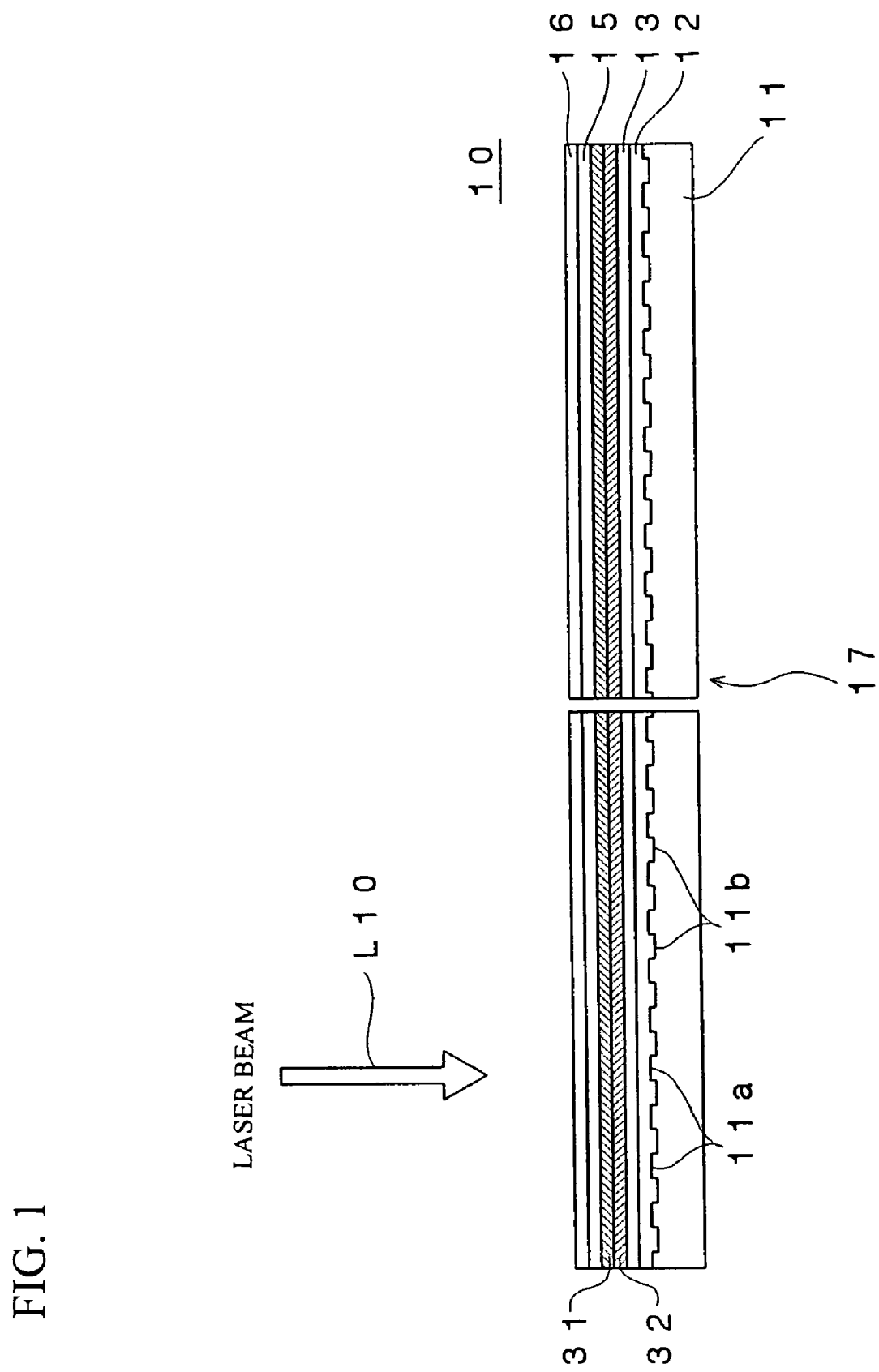
FIG. 1 is a schematic cross-sectional view showing the structure of an optical recording medium that is a preferred embodiment of the present invention.

FIG. 1 is a schematic cross-sectional view showing the structure of an optical recording medium that is a preferred embodiment of the present invention.

As shown in FIG. 1, the optical recording medium 10 according to this embodiment is constituted as a write-once type optical recording medium and includes a substrate 11, a reflective layer 12 formed on the surface of the substrate 11, a second dielectric layer 13 formed on the surface of the reflective layer 12, a second recording layer 32 formed on the surface of the second dielectric layer 13, a first recording layer 31 formed on the surface of the second recording layer 32, a first dielectric layer 15 formed on the surface of the first recording layer 31 and a light transmission layer 16 formed on the surface of the first dielectric layer 15.

As shown in FIG. 1, a center hole is formed at a center portion of the optical recording medium 10.

In this embodiment, as shown in FIG. 1, a laser beam L10 is projected onto the surface of the light transmission layer 16, thereby recording data in the optical recording medium 10 or reproducing data from the optical recording medium 10.

The substrate 11 serves as a support for ensuring mechanical strength required for the optical recording medium 10.

The material used to form the substrate 11 is not particularly limited insofar as the substrate 11 can serve as the support of the optical recording medium 10. The substrate 11 can be formed of glass, ceramic, resin or the like. Among these, resin is preferably used for forming the substrate 11 since resin can be easily shaped. Illustrative examples of resins suitable for forming the substrate 40 include polycarbonate resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin is most preferably used for forming the substrate 11 from the viewpoint of easy processing, optical characteristics and the like.

In this embodiment, the substrate 11 has a thickness of about 1.1 mm.

The shape of the substrate 11 is not particularly limited but is normally disk-like, card-like or sheet-like.

As shown in FIG. 1, grooves 11a and lands 11b are alternately formed on the surface of the substrate 11. The grooves 11a and/or lands 11b serve as a guide track for the laser beam L10 when data are to be recorded or when data are to be reproduced.

The reflective layer 12 serves to reflect the laser beam L10 entering through the light transmission layer 16 so as to emit it from the light transmission layer 16.

The thickness of the reflective layer 12 is not particularly limited but is preferably from 10 nm to 300 nm, more preferably from 20 nm to 200 nm.

The material used to form the reflective layer 12 is not particularly limited insofar as it can reflect a laser beam, and the reflective layer 12 can be formed of Mg, Al, Ti, Cr, Fe, Co, Ni, Cu, Zn, Ge, Ag, Pt, Au and the like. Among these materials, it is preferable to form the reflective layer 12 of a metal material having a high reflectivity, such as Al, Au, Ag, Cu or alloy containing at least one of these metals, such as alloy of Al and Ti.

The reflective layer 12 is provided in order to increase the difference in reflection coefficient between a recorded region and an unrecorded region by a multiple interference effect when the laser beam L10 is used to optically reproduce data from the first recording layer 31 and the second recording layer 32, thereby obtaining a higher reproduced signal (C/N ratio).

The first dielectric layer 15 and the second dielectric layer 13 serve to protect the first recording layer 31 and the second recording layer 32. Degradation of optically recorded data can be prevented over a long period by the first dielectric layer 15 and the second dielectric layer 13. Further, since the second dielectric layer 13 also serves to prevent the substrate 11 and the like from being deformed by heat, it is possible to effectively prevent jitter and the like from becoming worse due to the deformation of the substrate 11 and the like.

The dielectric material used to form the first dielectric layer 15 and the second dielectric layer 13 is not particularly limited insofar as it is transparent and the first dielectric layer 15 and the second dielectric layer 13 can be formed of a dielectric material containing oxide, sulfide, nitride or a combination thereof, for example, as a primary component. More specifically, in order to prevent the substrate 11 and the like from being deformed by heat and thus protect the first recording layer 31 and the second recording layer 32, it is preferable for the first dielectric layer 15 and the second dielectric layer 13 to contain at least one kind of dielectric material selected from the group consisting of $Al_2O_3$, AlN, ZnO, ZnS, GeN, GeCrN, CeO, SiO, $SiO_2$, SiN and SiC as a primary component and it is more preferable for the first dielectric layer 15 and the second dielectric layer 13 to contain $ZnS.SiO_2$ as a primary component.

The first dielectric layer 15 and the second dielectric layer 13 may be formed of the same dielectric material or of different dielectric materials. Moreover, at least one of the first dielectric layer 15 and the second dielectric layer 13 may have a multi-layered structure including a plurality of dielectric films.

In this specification, the statement that a dielectric layer contains a certain dielectric material as a primary component means that the dielectric material is maximum among dielectric materials contained in the dielectric layer. $ZnS.SiO_2$ means a mixture of ZnS and $SiO_2$.

The thickness of the first dielectric layer 15 and the second dielectric layer 13 is not particularly limited but is preferably from 3 nm to 200 nm. If the first dielectric layer 15 or the second dielectric layer 13 is thinner than 3 nm, it is difficult to obtain the above-described advantages. On the other hand, if the first dielectric layer 15 or the second dielectric layer 13 is thicker than 200 nm, it takes a long time to form the first dielectric layers 15 and the second dielectric layers 13, thereby lowering the productivity of the optical recording medium 10, and cracks may be generated in the optical recording medium 10 owing to stress present in the first dielectric layers 15 and/or the second dielectric layer 13.

The first recording layer 31 and the second recording layer 32 are adapted for recording data therein. In this embodiment, the first recording layer 31 is disposed on the side of the light transmission layer 16 and the second recording layer 32 is disposed on the side of the substrate 11.

In this embodiment, the first recording layer 31 contains an element selected from the group consisting of Si, Ge, Sn, Mg, In, Zn, Bi and Al as a primary component and the second recording layer 32 contains Cu as a primary component.

It is possible to improve the long term storage reliability of an optical recording medium 10 by providing the first recording layer 31 containing an element selected from the group consisting of Si, Ge, Sn, Mg, In, Zn, Bi and Al as a primary component and the second recording layer 32 containing Cu as a primary component in this manner.

Further, these elements apply only light load to the environment and there is no risk of harm to the global atmosphere.

In order to thoroughly improve the C/N ratio of the reproduced signal, it is particularly preferable for the first recording layer 31 to contain an element selected from the group consisting of Ge, Si, Mg, Al and Sn as a primary component and is particularly preferable for the to contain Si as a primary component.

Cu contained in the second recording layer 32 as a primary component quickly mixes with the element contained in the first recording layer 31 when irradiated with a laser beam L10, thereby enabling data to be quickly recorded in the first recording layer 31 and the second recording layer 32.

In order to improve the recording sensitivity of the first recording layer 31, it is preferable for the first recording layer 31 to be added with at least one kind of an element selected from the group consisting of Mg, Al, Cu, Ag and Au.

In order to improve the storage reliability and the recording sensitivity of the second recording layer 32, it is preferable for the second recording layer 32 to be added with at least one kind of an element selected from the group consisting of Al, Si, Zn, Mg, Au, Sn, Ge, Ag, P, Cr, Fe and Ti.

The total thickness of the first recording layer 31 and the second recording layer 32 is not particularly limited but the surface smoothness of the first recording layer 31 irradiated with the laser beam L10 becomes worse as the total thickness of the first recording layer 31 and the second recording layer 32 becomes thicker. As a result, the noise level of the reproduced signal becomes higher and the recording sensitivity is lowered. On the other hand, in the case where the total thickness of the first recording layer 31 and the second recording layer 32 is too small, the change in reflection coefficient between before and after irradiation with the laser beam L10 is small, so that a reproduced signal having high strength (C/N ratio) cannot be obtained. Moreover, it becomes difficult to control the thickness of the first recording layer 31 and the second recording layer 32.

Therefore, in this embodiment, the first recording layer 31 and the second recording layer 32 are formed so that the total thickness thereof is from 2 nm to 40 nm. In order to obtain a reproduced signal having higher strength (C/N ratio) and further decrease the noise level of the reproduced signal, the total thickness of the first recording layer 31 and the second recording layer 32 is preferably from 2 nm to 20 nm and more preferably 2 nm to 10 nm.

The individual thicknesses of the first recording layer 31 and the second recording layer 32 are not particularly limited but in order to considerably improve the recording sensitivity and greatly increase the change in reflection coefficient between before and after irradiation with the laser beam L10, the thickness of the first recording layer 31 is preferably from 1 nm to 30 nm and the thickness of the second recording layer 32 is preferably from 1 nm to 30 nm. Further, it is preferable to define the ratio of the thickness of the first recording layer 31 to the thickness of the second recording layer 32 (thickness of first recording layer 31/thickness of second recording layer 32) to be from 0.2 to 5.0.

The light transmission layer 16 serves to transmit a laser beam L10 and preferably has a thickness of 10 μm to 300 μm. More preferably, the light transmission layer 16 has a thickness of 50 μm to 150 μm.

The material used to form the light transmission layer 16 is not particularly limited but in the case where the light transmission layer 16 is to be formed by the spin coating process or the like, ultraviolet ray curable resin, electron beam curable resin or the like is preferably used. More preferably, the light transmission layer 16 is formed of ultraviolet ray curable resin.

The light transmission layer 16 may be formed by adhering a sheet made of light transmittable resin to the surface of the first dielectric layer 15 using an adhesive agent.

The optical recording medium 10 having the above-described configuration can, for example, be fabricated in the following manner.

The reflective layer 12 is first formed on the surface of the substrate 11 formed with the grooves 11a and lands 11b.

The reflective layer 12 can be formed by a gas phase growth process using chemical species containing elements for forming the reflective layer 12. Illustrative examples of the gas phase growth processes include vacuum deposition process, sputtering process and the like.

The second dielectric layer 13 is then formed on surface of the reflective layer 12.

The second dielectric layer 13 can be also formed by a gas phase growth process using chemical species containing elements for forming the second dielectric layer 13. Illustrative examples of the gas phase growth processes include vacuum deposition process, sputtering process and the like.

The second recording layer 32 is further formed on the second dielectric layer 13. The second recording layer 32 can be also formed by a gas phase growth process using chemical species containing elements for forming the second recording layer 32.

The first recording layer 31 is then formed on the second recording layer 32. The first recording layer 31 can be also formed by a gas phase growth process using chemical species containing elements for forming the first recording layer 31.

The first dielectric layer 15 is then formed on the first recording layer 31. The first dielectric layer 15 can be also formed by a gas phase growth process using chemical species containing elements for forming the first dielectric layer 15.

Finally, the light transmission layer 16 is formed on the first dielectric layer 15. The light transmission layer 16 can be formed, for example, by applying an acrylic ultraviolet ray curable resin or epoxy ultraviolet ray curable resin adjusted to an appropriate viscosity onto the surface of the second dielectric layer 15 by spin coating to form a coating layer and irradiating the coating layer with ultraviolet rays to cure the coating layer.

Thus, the optical recording medium 10 was fabricated.

Data are optically recorded in the optical recording medium 10 of the above-described configuration, in the following manner, for example.

As shown in FIGS. 1 and 2(a), the first recording layer 31 and the second recording layer 32 are first irradiated via the light transmission layer 16 with a laser beam L10 having predetermined power.

In order to record data with high recording density, it is preferable to project a laser beam L10 having a wavelength λ of 450 nm or shorter onto the optical recording medium 10 via an objective lens (not shown) having a numerical aperture NA of 0.7 or more and it is more preferable that λ/NA be equal to or smaller than 640 nm. In such a case, the spot diameter of the laser beam L10 on the surface of the first recording layer 31 becomes equal to or smaller than 0.65 μm.

In this embodiment, a laser beam L10 having a wavelength λ of 405 nm is condensed onto the optical recording medium 10 via an objective lens having a numerical aperture NA of 0.85 so that the spot diameter of the laser beam L10 on the surface of the first recording layer 31 becomes about 0.43 μm.

As a result, the element contained in the first recording layer 31 as a primary component and the element contained in the second recording layer 32 as a primary component mix with each other and as shown in FIG. 2(b), a recording mark M composed of a mixture of the primary component element of the first recording layer 31 and the primary component element of the second recording layer 32 is formed.

When the primary component elements of the first recording layers 31 and 32 are mixed, the reflection coefficient of the region markedly changes. Since the reflection coefficient of the thus formed recording mark M is therefore greatly different from that of the region surrounding the mixed region M, it is possible to obtain a high reproduced signal (C/N ratio) when optically recorded information is reproduced.

When the laser beam L10 is projected, the first recording layer 31 and the second recording layer 32 are heated by the laser beam L10. In this embodiment, however, the first dielectric layer 15 and the second dielectric layer 13 are disposed outward of the first recording layer 31 and the second recording layer 32. Deformation of the substrate 11 and the light transmission layer 16 by heat is therefore effectively prevented.

FIG. 3 is a set of diagrams showing a first pulse train pattern in the case where the 1.7RLL Modulation Code is employed, wherein FIG. 3(a) shows a pulse train pattern when a 2T signal is recorded and FIG. 3(b) shows a pulse train pattern when one of a 3T signal to an 8T signal is recorded.

The first pulse train pattern is a pattern for modulating the power of a laser beam L10 suitable for the case where it is necessary to cool the rear edge portion of a recording mark M and is particularly selected in the case where the ratio of the shortest blank region interval to the linear recording velocity (shortest blank region interval/linear recording velocity) is smaller than 40 nsec.

Figure 11:
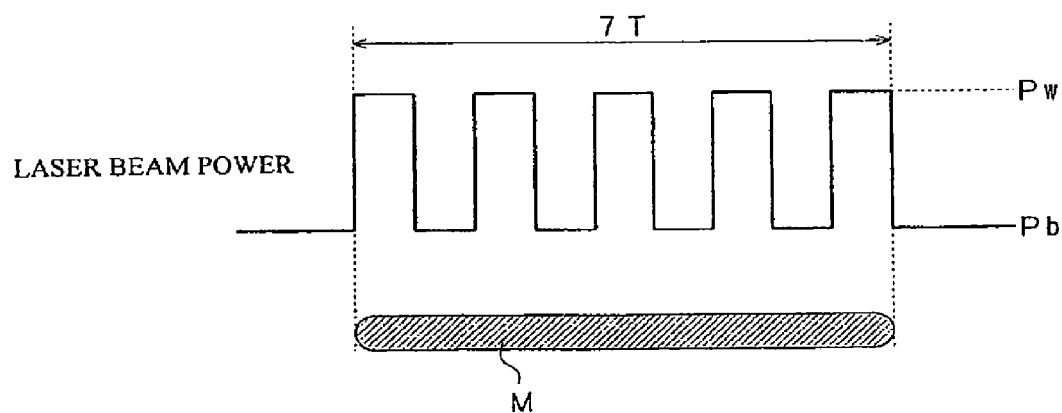
FIG. 11 is a diagram showing a typical pulse train pattern (basic pulse train pattern) used for recording data in a DVD-R including a recording layer containing an organic dye.

As shown in FIGS. 3(a) and 3(b), in the first pulse train pattern, a recording pulse for forming a recording mark M is divided into (n−1) divided pulses and the power of a laser beam L10 is set to a recording power Pw at the peak of each of the divided pulses, set to a second bottom power Pb2 immediately after the last divided pulse and set to a first bottom power Pb1 at other portions of the pulse. Specifically, the first pulse train pattern is constituted by inserting a cooling interval $T_{cl(last)}$ at which the power of a laser beam L10 is set to a second bottom power Pb2 at a portion immediately after the last divided pulse in the basic pulse train pattern shown in FIG. 11.

The recording power Pw is set to a high level at which the element contained in the first recording layer 31 as a primary component and the element contained in the second recording layer 32 as a primary component can be heated and mixed to form a record mark M when a laser beam having the recording power Pw is projected onto the optical recording medium 10. On the other hand, the first bottom power Pb1 and the second bottom power Pb2 are set to a low level at which the element contained in the first recording layer 31 as a primary component and the element contained in the second recording layer 32 as a primary component cannot substantially be mixed even when a laser beam having the first bottom power Pb1 or the second bottom power Pb2 is projected onto the optical recording medium 10.

As shown in FIG. 3, the first bottom power Pb1 and the second bottom power Pb2 are determined so that the first bottom power Pb1 is higher than the second bottom power Pb2, thereby effectively cooling the rear edge portion of a recording mark M heated by a laser beam L10 whose power is set to the recording power Pw projected onto the optical recording medium 10 for forming the recording mark M and preventing the element contained in the first recording layer 31 as a primary component and the element contained in the second recording layer 32 as a primary component from mixing with each other at a region downstream of the rear edge portion of the recording mark M with respect to the moving direction of the laser beam L10.

Therefore, in the case of modulating the power of a laser beam L10 using the first pulse train pattern and recording data in the optical recording medium 10, since the length of a recording mark M can be controlled so as to have a desired length, it is possible to reduce jitter of a signal and increase a C/N ratio thereof even in the case where data are recorded by setting the ratio of the shortest blank region interval to the linear recording velocity (shortest blank region interval/linear recording velocity) smaller than 40 nsec.

FIG. 4 is a set of diagrams showing a first pulse train pattern in the case where the 1.7RLL Modulation Code is employed, wherein FIG. 4(a) shows a pulse train pattern when a 2T signal is recorded and FIG. 4(b) shows a pulse train pattern when one of a 3T signal to an 8T signal is recorded.

The second pulse train is a pattern suitable for the case where it is necessary to cool the front edge portion of a recording mark M, in other words, the case where thermal interference between neighboring recording marks becomes large since the recording velocity becomes high and the recording density of data becomes high and the case where data are to be recorded using a laser beam L10 having a low power, and the second pulse train pattern is particularly preferable in the case of recording data in an optical recording medium 10 having low recording sensitivity by setting the ratio of the shortest blank region interval to the linear recording velocity (shortest blank region interval/linear recording velocity) smaller than 20 nsec.

As shown in FIGS. 4(a) and 4(b), in the second pulse train pattern, the recording pulse for forming a recording mark M is divided into (n−1) divided pulses and the power of the laser beam L10 is set to a recording power Pw at the peak of each of the divided pulses, set to a second bottom power Pb2 immediately before the first divided pulse and set to a first bottom power Pb1 at other portions of the pulse. Specifically, the second pulse train pattern is constituted by inserting a cooling interval $T_{cl(last)}$ at which the power of a laser beam L10 is set to a second bottom power Pb2 at a portion immediately before the first divided pulse in the basic pulse train pattern shown in FIG. 11.

Here, the recording power Pw, the first bottom power Pb1 and the second bottom power Pb2 are determined similarly to in the first pulse train pattern.

In the case of modulating the power of a laser beam L10 using the second pulse train pattern and recording data in the optical recording medium 10, since the front edge portion of a recording mark M heated by thermal interference between neighboring recording marks is effectively cooled, it is possible to prevent the element contained in the first recording layer 31 as a primary component and the element contained in the second recording layer 32 as a primary component from mixing with each other at a region upstream of the front edge portion of the recording mark M with respect to the moving direction of the laser beam L10.

Therefore, in the case of modulating the power of a laser beam L10 using the second pulse train pattern and recording data in the optical recording medium 10, since the length of a mixed region M can be controlled so as to have a desired length, it is possible to reduce jitter of a signal and increase the C/N ratio thereof even in the case where data are recorded by setting the ratio of the shortest blank region interval to the linear recording velocity (shortest blank region interval/linear recording velocity) to be very small, for example, smaller than 20 nsec.

FIG. 5 is a set of diagrams showing a first pulse train pattern in the case where the 1.7RLL Modulation Code is employed, wherein FIG. 5(a) shows a pulse train pattern when a 2T signal is recorded and FIG. 5(b) shows a pulse train pattern when one of a 3T signal to an 8T signal is recorded.

The third pulse train pattern is a pattern suitable for the case where it is necessary to cool the front edge portion and the rear edge portion of a recording mark M, in other words, the case where thermal interference between neighboring recording marks becomes large since the recording velocity becomes high and the recording density of data becomes high, and the third pulse train pattern is particularly preferable in the case of recording data in an optical recording medium having low recording sensitivity by setting the ratio of the shortest blank region interval to the linear recording velocity (shortest blank region interval/linear recording velocity) to be smaller than 20 nsec.

As shown in FIGS. 5(a) and 5(b), in the third pulse train pattern, the recording pulse for forming a recording mark M is divided into (n−1) divided pulses and the power of the laser beam L10 is set to a recording power Pw at the peak of each of the divided pulses, set to a second bottom power Pb2 immediately before the first divided pulse and immediately after the last divided pulse and set to a first bottom power Pb1 at other portions of the pulse. Specifically, the third pulse train pattern is constituted by inserting the cooling interval $T_{cl(front)}$ at a portion immediately before the first divided pulse in the basic pulse train pattern shown in FIG. 11 and the cooling interval $T_{cl(last)}$ into a portion immediately after the last divided pulse thereof.

Here, the recording power Pw, the first bottom power Pb1 and the second bottom power Pb2 are determined similarly to in the first pulse train pattern.

In the case of modulating the power of a laser beam L10 using the third pulse train pattern and recording data in the optical recording medium 10, since the rear edge portion of a recording mark M heated by the laser beam L10 whose power is set to the recording power Pw and projected for forming the recording mark M is effectively cooled, it is possible to prevent the element contained in the first recording layer 31 as a primary component and the element contained in the second recording layer 32 as a primary component from mixing with each other at a region downstream of the rear edge portion of the recording mark M with respect to the moving direction of the laser beam L10. Further, since the front edge portion of a recording mark M heated by thermal interference between neighboring recording marks is effectively cooled, it is possible to prevent the element contained in the first recording layer 31 as a primary component and the element contained in the second recording layer 32 as a primary component from mixing with each other at a region upstream of the front edge portion of the recording mark M with respect to the moving direction of the laser beam L10.

Therefore, in the case of modulating the power of a laser beam L10 using the third pulse train pattern and recording data in the optical recording medium 10, since the length of a mixed region M can be controlled so as to have a desired length, it is possible to reduce jitter of a signal and increase the C/N ratio thereof even in the case where data are recorded by setting the ratio of the shortest blank region interval to the linear recording velocity (shortest blank region interval/linear recording velocity) to be extremely small, for example, smaller than 20 nsec.

According to this embodiment, the pulse train pattern used for modulating the power of a laser beam L10 is constituted by dividing a recording pulse into (n–a) divided pulses where a is 0, 1 or 2 and it is preferable to set a to 2 in the 8/16 Modulation Code and set a to 1 in 1,7RLL Modulation Code and inserting the cooling interval $T_{cl(last)}$ at a portion immediately after the last divided pulse, or inserting the cooling interval $T_{cl(front)}$ at a portion immediately before the first divided pulse, or inserting the cooling interval $T_{cl(last)}$ at a portion immediately after the last divided pulse and inserting the cooling interval $T_{cl(front)}$ at a portion immediately before the first divided pulse. As a result, it is possible to effectively prevent the rear edge portion and/or the front edge portion of a recording mark M from being shifted and it is therefore possible to reduce jitter of a signal and increase the C/N ratio thereof even in the case of setting the ratio of the shortest blank region interval to the linear recording velocity (shortest blank region interval/linear recording velocity) to be small and recording data.

Figure 6:
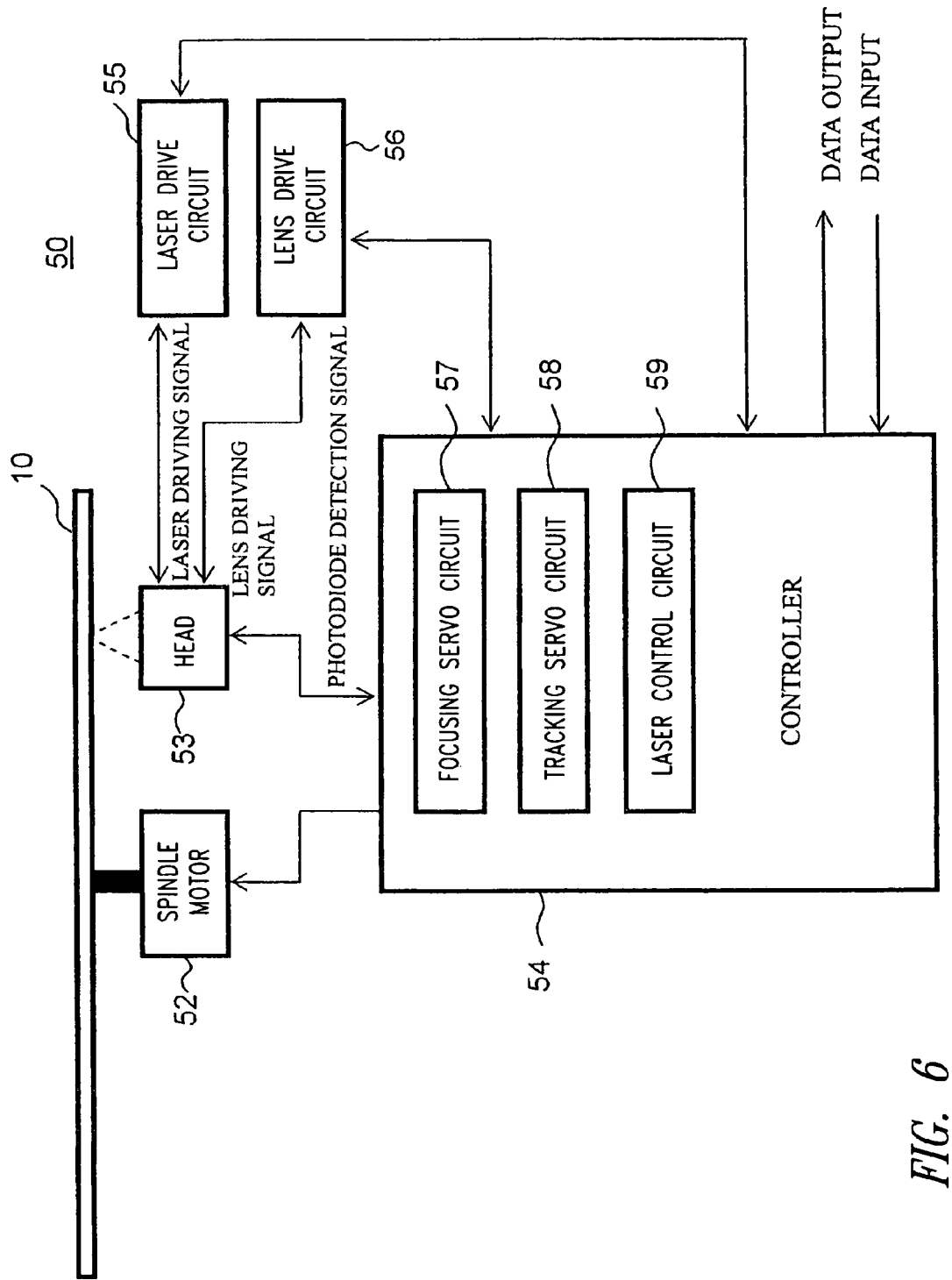
FIG. 6 is a block diagram showing a data recording and reproducing apparatus that is a preferred embodiment of the present invention.

FIG. 6 is a block diagram showing a data recording apparatus that is a preferred embodiment of the present invention.

As shown in FIG. 6, a data recording apparatus 100 includes a spindle motor 52 for rotating the optical recording medium 10, a head 53 for projecting a laser beam onto the optical recording medium 10 and receiving the light reflected by the optical recording medium 10, a controller 54 for controlling the operation of the spindle motor 52 and the head 53, a laser drive circuit 55 for feeding a laser drive signal to the head 53, and a lens drive circuit 56 for feeding a lens drive signal to the optical head 53.

As shown in FIG. 6, the controller 54 includes a focus servo tracking circuit 57, a tracking servo circuit 58 and a laser control circuit 59.

When the focus servo tracking circuit 57 is activated, a laser beam L10 is focused onto the first recording layer 51 of the rotating optical recording medium 10 and when the tracking servo circuit 58 is activated, the spot of the laser beam L10 automatically follows the track of the optical recording medium 10.

As shown in FIG. 6, each of the focus servo tracking circuit 57 and the tracking servo circuit 58 has an auto-gain control function for automatically adjusting the focus gain and an auto-gain control function for automatically adjusting the tracking gain.

Further, the laser control circuit 59 is adapted to generate a laser drive signal to be supplied by the laser drive circuit 55.

In this embodiment, data for identifying the above described first pulse train pattern, second pulse train pattern and third pulse train pattern are recorded in the optical recording medium 10 together with data for identifying various recording conditions, such as a linear recording velocity necessary for recording data, as data for setting recording conditions in the form of wobbles or pre-pits.

Therefore, the laser control circuit 59 reads data for setting recording conditions recorded in the optical recording medium 10 prior to recording data in the optical recording medium 10, selects one of the first pulse train pattern, the second pulse train pattern and the third pulse train pattern based on the thus read data for setting recording conditions to generate a laser drive signal and causes the laser drive circuit 55 to output it to the head 53.

Thus, data are recorded in the optical recording medium 10 in accordance with the desired recording strategy.

According to this embodiment, the optical recording medium 10 is recorded with data for identifying the first pulse train pattern, the second pulse train pattern and the third pulse train pattern together with data for identifying various recording conditions, such as a linear recording velocity necessary for recording data, as data for setting recording conditions and prior to recording data in the optical recording medium 10, the laser control circuit 59 reads data for setting recording conditions recorded in the optical recording medium 10, selects one of the first pulse train pattern, the second pulse train pattern and the third pulse train pattern based on the thus read data for setting recording conditions to generate a laser drive signal and control the head 53 for projecting a laser beam onto the optical recording medium 10. Therefore, it is possible to record data in accordance with the desired recording strategy.

WORKING EXAMPLES AND A COMPARATIVE EXAMPLE

Hereinafter, working examples and a comparative example will be set out in order to further clarify the advantages of the present invention.

[Fabrication an Optical Recording Medium]

An optical recording medium having the same configuration as that of the optical recording medium 1 shown in FIG. 1 was fabricated in the following manner.

A polycarbonate substrate having a thickness of 1.1 mm and a diameter of 120 mm was first set on a sputtering apparatus. Then, a reflective layer containing a mixture of Ag, Pd and Cu and having a thickness of 100 nm, a second dielectric layer containing a mixture of ZnS and $SiO_2$ and having a thickness of 30 nm, a second recording layer containing Cu as a primary component and having a thickness of 5 nm, a first recording layer containing Si as a primary component and having a thickness of 5 nm and a first dielectric layer containing the mixture of ZnS and $SiO_2$ and having a thickness of 25 nm were sequentially formed on the polycarbonate substrate using the sputtering process.

The mole ratio of ZnS to $SiO_2$ in the mixture of ZnS and $SiO_2$ contained in the first dielectric layer and the second dielectric layer was 80:20.

Further, the first dielectric layer was coated using the spin coating method with an acrylic ultraviolet ray curable resin to form a coating layer and the coating layer was irradiated with ultraviolet rays, thereby curing the acrylic ultraviolet ray curable resin to form a light transmission layer having a thickness of 100 μm.

Working Example 1

The thus fabricated optical recording medium was set in an optical recording medium evaluation apparatus "DDU1000" (Product Name) manufactured by Pulstec Industrial Co., Ltd. Then, a blue laser beam having a wavelength of 405 nm was employed as the laser beam for recording data and the laser beam was condensed onto the optical recording medium via the light transmission layer using an objective lens whose numerical aperture was 0.85, and data were recorded therein under the following recording signal conditions.

Modulation Code: (1.7) RLL
Channel Bit Length: 0.12 μm
Linear Recording Velocity: 5.3 m/sec
Channel Clock: 66 MHz
Recording Signal: random signal including a 2T signal to an 8T signal in no particular order.

The power of the laser beam was modulated by the first pulse train pattern including (n-1) divided pulses as a recording pulse wherein n was an integer of from 2 to 8, the length of the cooling interval $T_{cl(last)}$ was fixed at 1T and the second bottom power Pb2 was fixed at 0.1 mW, while the first bottom power Pb1 was varied between 0.5 mW, 1.0 mW and 1.5 mW and the recording power Pw was varied.

The data transfer rate was about 35 Mbps when the format efficiency was 80% and the ratio of the shortest blank region interval to the linear recording velocity (shortest blank region interval/linear recording velocity) was 30.4 nsec.

Working Example 2

Data were recorded in the optical recording medium in the manner of Working Example 1 except that a 2T signal was recorded using the first pulse train pattern and each of a 3T signal to an 8T signal was recorded using the basic pulse train pattern.

Working Example 3

Data were recorded in the optical recording medium in the manner of Working Example 1 except that the power of a laser beam was modulated using the second pulse train pattern.

The length of the cooling interval $T_{cl(last)}$ was set to 1T.

Working Example 4

Data were recorded in the optical recording medium in the manner of Working Example 1 except that a 2T signal was recorded using the second pulse train pattern and each of a 3T signal to an 8T signal was recorded using the basic pulse train pattern.

The length of the cooling interval $T_{cl(last)}$ was set to 1T.

Working Example 5

Data were recorded in the optical recording medium in the manner of Working Example 1 except that the power of a laser beam was modulated using the third pulse train pattern.

The length of the cooling interval $T_{cl(last)}$ and the cooling interval $T_{cl(front)}$ were set to 1T, respectively.

Working Example 6

Data were recorded in the optical recording medium in the manner of Working Example 1 except that a 2T signal was recorded using the third pulse train pattern and each of a 3T signal to an 8T signal was recorded using the basic pulse train pattern.

The length of the cooling interval $T_{cl(last)}$ and the cooling interval $T_{cl(front)}$ were set to 1T, respectively.

Comparative Example

Data were recorded in the optical recording medium in the manner of Working Example 1 except that the power of a laser beam was modulated using the basic pulse train pattern.

Then, data recorded in the optical recording medium were reproduced using the above mentioned optical recording medium evaluation apparatus and the C/N ratio of the 2T signal recorded using the laser beam having an optimum recording power Pw was measured. When data were reproduced, a laser beam having a wavelength of 405 nm and an objective lens whose numerical aperture (NA) was 0.85 were employed.

Here, the recording power Pw when jitter was minimum was determined as the optimum recording power Pw.

Figure 7:
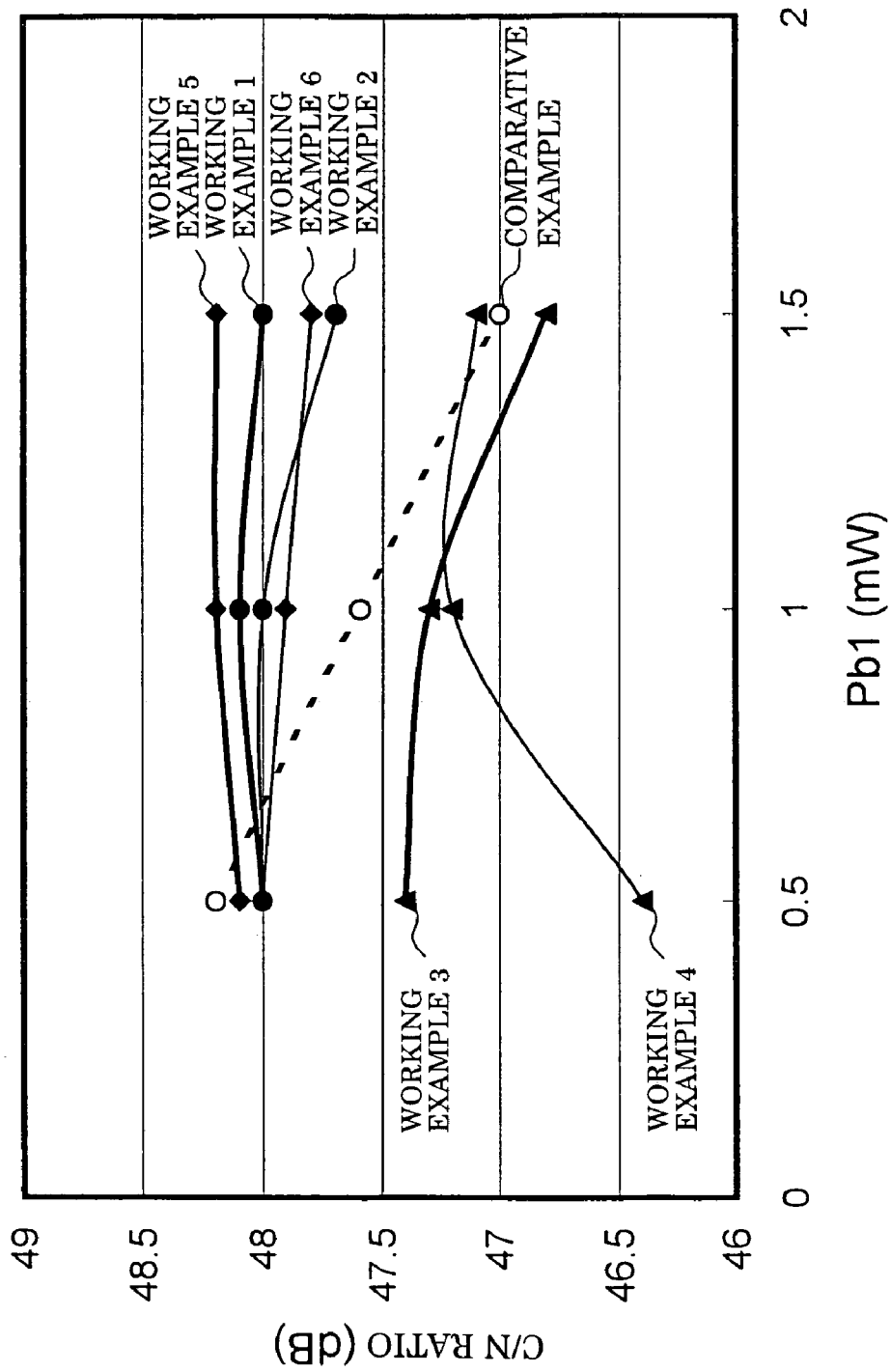
FIG. 7 is a graph showing the relationship between a C/N ratio of a 2T signal and a first bottom power Pb1 in the case where data were recorded at a data transfer rate of about 35 Mbps using a laser beam having an optimum recording power Pw determined as a recording power Pw when jitter was minimum.

The results of the measurement are shown in FIG. 7.

As shown in FIG. 7, in Working Examples 1, 2, 5 and 6 in which data were recorded by modulating the power of the laser beam using pulse train patterns each including the cooling interval $T_{cl(last)}$, it was found that the C/N ratio of the 2T signal was hardly lowered even when the first bottom power Pb1 was increased.

Therefore, it was found that in the case where data were recorded at a data transfer rate of about 35 Mbps, if the power of the laser beam was modulated using a pulse train pattern including the cooling interval $T_{cl(last)}$, data could be recorded with a low recording power Pw by setting the first bottom power Pb1 to a high value.

To the contrary, in Working Example 3 in which data were recorded by modulating the power of the laser beam using the pulse train pattern including no cooling interval $T_{cl(last)}$, it was found that when the first bottom power Pb1 was set too high, the C/N ratio of the 2T signal became worse and in Working Example 4, it was found that the C/N ratio of the 2T signal was low as a whole. It is reasonable to conclude that this was because in the case where the ratio of the shortest blank region interval to the linear recording velocity was 30.4 nsec, the front edge portion of a recording mark was not shifted in a direction opposite to the moving direction of the laser beam due to thermal interference between neighboring recording marks.

On the other hand, as shown in FIG. 7, in Comparative Example in which data were recorded by modulating the power of the laser beam using the basic pulse train pattern, it was found that the C/N ratio of the 2T signal became markedly worse as the first bottom power Pb1 was increased.

Random signals including a 2T signal to an 8T signal in no particular order were recorded in the optical recording medium similarly to the above except that the linear recording velocity was set to 10.6 m/sec, the channel clock frequency was set to 133 MHz and the first bottom power Pb1 was varied between 0.5 mW, 1.0 mW, 1.5 mW and 2.0 mW. Data thus recorded in the optical recording medium were reproduced and the C/N ratio of the 2T signal recorded using a laser beam having the optimum recording power Pw was measured.

Here, a data transfer rate was about 70 Mbps when the format efficiency was 80% and the ratio of the shortest blank region interval to the linear recording velocity (shortest blank region interval/linear recording velocity) was 15.2 nsec.

Figure 8:
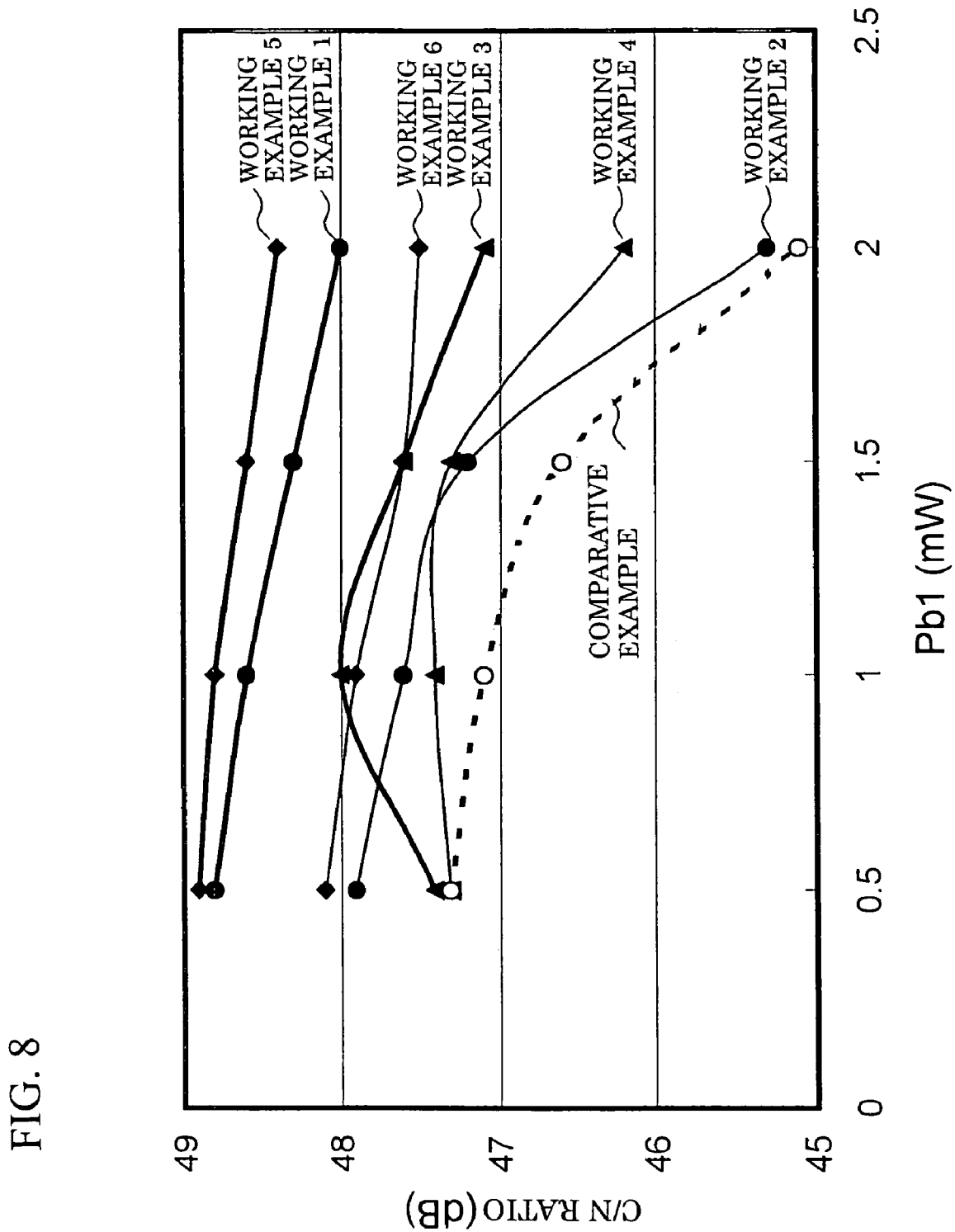
FIG. 8 is a graph showing the relationship between a C/N ratio of a 2T signal and a first bottom power Pb1 in the case where data were recorded at a data transfer rate of about 70 Mbps using a laser beam having an optimum recording power Pw determined as a recording power Pw when jitter was minimum.

The results of the measurement are shown in FIG. 8.

As shown in FIG. 8, it was found that the C/N ratio of the 2T signal became worse in each case as the first bottom power Pb1 was increased. However, it was found that the C/N ratio of the 2T signal was better than that in Comparative Example in each of Working Examples 1 and 2 in which data were recorded by modulating the power of the laser beam using pulse train patterns each including the cooling interval $T_{cl(last)}$, Working Examples 3 and 4 in which data were recorded by modulating the power of the laser beam using pulse train patterns each including the cooling interval $T_{cl(front)}$ and Working Examples 5 and 6 in which data were recorded by modulating the power of the laser beam using pulse train patterns each including the cooling interval $T_{cl(front)}$ and the cooling interval $T_{cl(last)}$.

Therefore, it was found that in the case where data were recorded at a data transfer rate of about 70 Mbps, it is preferable when recording data to modulate the power of the laser beam using a pulse train pattern including the cooling interval $T_{cl(last)}$, a pulse train pattern including the cooling interval $T_{cl(front)}$, or a pulse train pattern including the cooling interval $T_{cl(last)}$ and the cooling interval $T_{cl(front)}$.

In particular, in each of Working Example 1 in which data were recorded using the first pulse train pattern, Working Example 3 in which data were recorded using the second pulse train pattern, Working Example 5 in which data were recorded using the third pulse train pattern and Working Example 6 in which data were recorded in such a manner that a 2T signal was recorded using the third pulse train pattern and each of a 3T signal to an 8T signal was recorded using the basic pulse train pattern, it was found that even in the case where the first bottom power Pb1 was increased to 2 mW, the C/N ratio of the 2T signal was substantially equal to or higher than that in Comparative Example in which the power of a laser beam was modulated using the basic pulse train pattern wherein the first bottom power Pb1 was set to 0.5 mW to record data and that data could be recorded with a low recording power Pw by setting the first bottom power Pb1 to a high value in the case where data were recorded by modulating the power of a laser beam using one of these pulse train patterns.

Further, random signals including a 2T signal to an 8T signal in no particular order were recorded in the optical recording medium similarly to the above except that the linear recording velocity was set to 10.6 m/sec and the channel clock was set to 133 MHz and the first bottom power Pb1 was varied between 0.5 mW, 1.0 mW, 1.5 mW, 2.0 mW and 2.5 mW. Then, data thus recorded in the optical recording medium were reproduced to measure the C/N ratio of the reproduced signal and the relationship between the optimum power Pw and the first bottom power Pb1 of the laser beam was measured.

Figure 9:
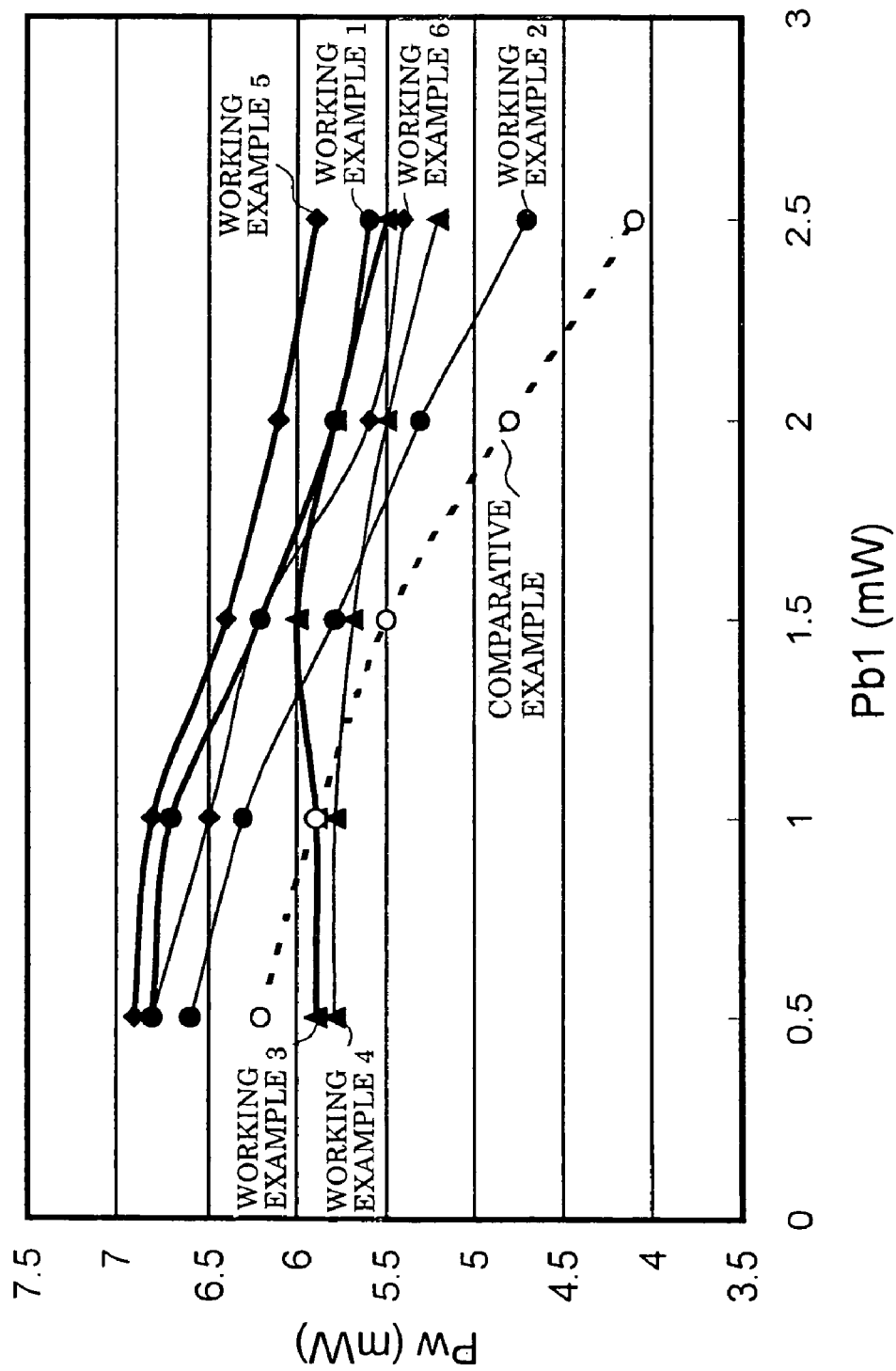
FIG. 9 is a graph showing the relationship between an optimum recording power of a laser beam determined as a recording power Pw when jitter was minimum and a first bottom power Pb1 in the case where data were recorded at a data transfer rate of about 70 Mbps using a laser beam having the optimum recording power Pw.
Figure 10:
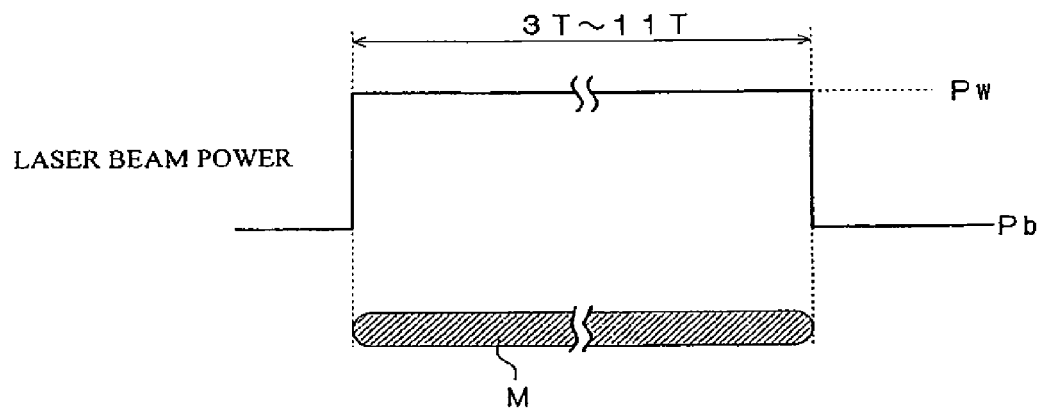
FIG. 10 is a diagram showing a typical pulse train pattern used for recording data in a CD-R including a recording layer containing an organic dye.

The results of the measurement are shown in FIG. 9.

As shown in FIG. 9, it was found that in each case, if the first bottom power Pb1 was set higher, the optimum recording power Pw of the laser beam decreased and that data could be recorded using a laser beam having a low recording power Pw.

However, it was found that in each case, in the case where the first bottom power Pb1 was set equal to or higher than 2.5 mW, the element contained in the first recording layer as a primary component and the element contained in the second recording layer as a primary component mixed with each other to form a recording mark M even at a blank region and a C/N ratio became considerably worse.

The present invention has thus been shown and described with reference to a specific embodiment and Working Examples. However, it should be noted that the present invention is in no way limited to the details of the described arrangements but changes and modifications may be made without departing from the scope of the appended claims.

For example, in the above described embodiment and Working Examples, although the first recording layer 31 and the second recording layer 32 are formed in contact with each other, it is not absolutely necessary to form the first recording layer 31 and the second recording layer 32 in contact with each other but it is sufficient for the second recording layer 32 to be so located in the vicinity of the first recording layer 31 as to enable formation of a mixed region including the primary component element of the first recording layer 31 and the primary component element of the second recording layer 32 when the region is irradiated with a laser beam. Further, one or more other layers such as a dielectric layer may be interposed between the first recording layer 31 and the second recording layer 32.

Further, in the above described embodiment, although the first recording layer 31 contains an element selected from the group consisting of Si, Ge, Sn, Mg, In, Zn, Bi and Al as a primary component and the second recording layer 32 contains Cu as a primary component, it is not absolutely necessary for the first recording layer 31 to contain an element selected from the group consisting of Si, Ge, Sn, Mg, In, Zn, Bi and Al as a primary component and for the second recording layer 32 to contain Cu as a primary component and the first recording layer 31 may contain an element selected from the group consisting of Si, Ge, C, Sn, Zn and Cu as a primary component and the second recording layer 32 may contain Al as a primary component. Further, the first recording layer 31 may contain an element selected from the group consisting of Si, Ge, C and Al as a primary component and the second recording layer 32 may contain Zn as a primary component. Moreover, it is sufficient for the first recording layer 31 and the second recording layer 32 to contain different elements from each other and contain an element selected from the group consisting of Al, Si, Ge, C, Sn, Au, Zn, Cu, B, Mg, Ti, Mn, Fe, Ga, Zr, Ag and Pt as a primary component.

Furthermore, in the above described embodiment and Working Examples, although the optical recording medium 10 includes the first recording layer 31 and the second recording layer 32, the optical recording medium may include one or more recording layers containing an element selected from the group consisting of Si, Ge, Sn, Mg, In, Zn, Bi and Al as a primary component or one or more recording layers containing Al as a primary element, in addition to the first recording layer 31 and the second recording layer 32.

Moreover, although the first recording layer 31 is disposed on the side of the light transmission layer 16 and the second recording layer 32 is disposed on the side of the substrate 11 in the above described embodiment and working examples, it is possible to dispose the first recording layer 31 on the side of the substrate 11 and the second recording layer 32 on the side of the light transmission layer 16.

Further, in the above described embodiment and Working Examples, the optical recording medium 10 includes the first dielectric layer 15 and the second dielectric layer 13 and the first recording layer 31 and the second recording layer 32 are disposed between the first dielectric layer 15 and the second dielectric layer 13. However, it is not absolutely necessary for the optical recording medium 10 to include the first dielectric layer 15 and the second dielectric layer 13, i.e., the optical recording medium 10 may include no dielectric layer. Further, the optical recording medium 10 may include a single dielectric layer and in such case the dielectric layer may be disposed on either the side of the substrate 11 or the side of the light transmission layer 16 with respect to the first recording layer 31 and the second recording layer 32.

Furthermore, in Working Examples, although the first recording layer and the second recording layer are formed so as to have the same thickness in the above described embodiment and working examples, it is not absolutely necessary to form the first recording layer and the second recording layer so as to have the same thickness.

Moreover, in the above described embodiment and Working Examples, although the optical recording medium 10 is provided with the reflective layer 12, if the level of reflected light in the recording mark M formed by the mixing an element contained in the first recording layer as a primary component and Zn contained in the second recording layer as a primary component and the level of reflected light in regions onto which the laser beam was not projected greatly differ from each other, the reflective layer may be omitted.

Further, in the above described embodiment, although all recording marks M are formed by modulating the power of a laser beam in accordance with the first pulse train pattern, the second pulse train pattern and the third pulse train pattern, it is only in the case where the length of a recording mark M is short that the width of the recording mark M becomes thin and the C/N ratio (carrier/noise ratio) of the signal is considerably lowered when the recording power Pw of a laser beam is lowered in order to prevent the front edge portion and/or the rear edge portion of a recording mark M from being shifted and the recording mark M from becoming longer than a desired length. Therefore, it is possible to modulate the power of the laser beam in accordance with the first pulse train pattern, the second pulse train pattern or the third pulse train pattern only in the case where a 2T signal is to be recorded to form a short recording mark M and to modulate the power of the laser beam in accordance with the basic pulse train pattern in the case of recording one of a 3T signal to an 8T signal to form a recording mark M.

Furthermore, in the embodiment shown in FIG. 6, although the data for setting recording conditions are recorded in the optical recording medium 10 in the form of wobbles or pre-pits, data for setting recording conditions may be recorded in the first recording layer 31 or the second recording layer 32.

Moreover, in the embodiment shown in FIG. 6, although the focus servo tracking circuit 57, the tracking servo circuit 58 and the laser control circuit 59 are incorporated into the controller 54, it is not absolutely necessary to incorporate the focus servo tracking circuit 57, the tracking servo circuit 58 and the laser control circuit 59 into the controller 54, and the focus servo tracking circuit 57, the tracking servo circuit 58 and the laser control circuit 59 may be provided separately from the controller 54. Moreover, it is alternatively possible to install software for accomplishing functions of the focus servo tracking circuit 57, the tracking servo circuit 58 and the laser control circuit 59 in the controller 54.

Further, in the above described embodiments and Working Examples, although the explanation was made as to the case where data are recorded in a next-generation type optical recording medium 10 in which the rear edge portion and the front edge portion of a recording mark M tend to be shifted since a laser beam whose energy amount per unit area is extremely high is employed, the present invention is not limited to application to the case of recording data in a next-generation type optical recording medium but the present invention can be widely applied to the case of recording data in a write-once type optical recording medium other than a next-generation type optical recording medium.

According to the present invention, it is possible to provide a method for recording data in an optical recording medium which can form a recording mark having desired length and width in a write-once type optical recording medium.

Further, according to the present invention, it is possible to provide a method for recording data in an optical recording medium which can form a recording mark having desired length and width in a write-once type optical recording medium even in the case where the ratio of the shortest blank region interval to the linear recording velocity is small.

Furthermore, according to the present invention, it is possible to provide a method for recording data in an optical recording medium which can form a recording mark having desired length and width in a write-once type optical recording medium using a laser beam whose recording power is set low.

Moreover, according to the present invention, it is possible to provide a method for recording data in an optical recording medium which can form a recording mark having desired length and width in a write-once type optical recording medium including two or more recording layers.

Further, according to the present invention, it is possible to provide an apparatus for recording data in an optical recording medium which can form a recording mark having desired length and width in a write-once type optical recording medium.

Furthermore, according to the present invention, it is possible to provide an apparatus for recording data in an optical recording medium which can form a recording mark having desired length and width in a write-once type optical recording medium even in the case where the ratio of the shortest blank region interval to the linear recording velocity is small.

Moreover, according to the present invention, it is possible to provide an apparatus for recording data in an optical recording medium which can form a recording mark having desired length and width in a write-once type optical recording medium using a laser beam whose recording power is set low.

Further, according to the present invention, it is possible to provide an apparatus for recording data in an optical recording medium which can form a recording mark having desired length and width in a write-once type optical recording medium including two or more recording layers.

Furthermore, according to the present invention, it is possible to provide a write-once type optical recording medium in which a recording mark having desired length and width can be formed.

Moreover, according to the present invention, it is possible to provide a write-once type optical recording medium in which a recording mark having desired length and width can be formed even in the case where the ratio of the shortest blank region interval to the linear recording velocity is small.

Further, according to the present invention, it is possible to provide a write-once type optical recording medium in which a recording mark having desired length and width can be formed using a laser beam whose recording power is set low.

Furthermore, according to the present invention, it is possible to provide a write-once type optical recording medium in which a recording mark having desired length and width can be formed including two or more recording layers.

The invention claimed is:

1. A method for recording data in an optical recording medium wherein data are recorded in a write-once type optical recording medium comprising a substrate and at least one recording layer formed on the substrate, comprising:

projecting a laser beam through an objective lens onto the optical recording medium to record the data, the laser beam having a wavelength $\lambda$ equal to or shorter than 450 nm, the objective lens having a numerical aperture (NA) operable to satisfy $\lambda/NA \leq 640$ nm, and a power of the laser beam is modulated by a pulse train pattern including at least a pulse whose level is set to a level corresponding to a recording power and a pulse whose level is set to a level corresponding to a first bottom power onto the at least one recording layer and forming at least two recording marks in the at least one recording layer; and modulating the power of the laser beam by the pulse train pattern further including a pulse whose level is set to a level corresponding to a second bottom power lower than the first bottom power on at least one of front and rear sides of the pulse whose level is set to the level corresponding to the recording power, wherein the pulse whose level is set to the recording level has (n–a) divided pulses when a recording mark having a length nT is formed, where n is an integer equal to or large that 2, where a is set to 2 in an 8/16 Modulation Code and a is set to 1 in a 1.7RLL modulation, and where T is a clock cycle, the at least two recording marks formed by setting a ratio of a shortest blank region interval to a linear recording velocity to be equal to or smaller than 20 nsec and the pulse whose level is set to a level corresponding to the recording level is constituted by divided pulses of a number corresponding to a length of the recording mark, and setting the power of the laser beam to the first bottom power between neighboring divided pulses.

2. The method for recording data in the optical recording medium in accordance with claim 1, further comprises providing a light transmission layer, a first recording layer and a second recording layer formed between the substrate and the light transmission layer, the second recording layer having the at least two recording marks formed therein by projecting the laser beam thereonto, thereby mixing an element contained in the first recording layer as a primary component and an element contained in the second recording layer as a primary component.

3. The method for recording data in the optical recording medium in accordance with claim 2, further comprising forming the second recording layer so as to be in contact with the first recording layer.

4. An apparatus for recording data in an optical recording medium, the apparatus comprising:

a laser beam projecting device to project a laser beam having a wavelength $\lambda$ equal to or shorter than 450 nm, and whose power is modulated by a pulse train pattern including at least a pulse whose level is set to a level corresponding to a recording power and a pulse whose level is set to a level corresponding to a first bottom power onto a write-once type recording medium including a substrate and at least one recording layer formed on the substrate, the laser beam projecting device operable to modulate the power of the laser beam by the pulse train pattern further including a pulse whose level is set to a level corresponding to a second bottom power lower than the first bottom power on at least one of front and rear sides of the pulse whose level is set to the level corresponding to the recording power, wherein the laser beam projecting device is operable to form the pulse whose level is set to the recording level with (n–a) divided pulses when a recording mark having a length nT is formed, where n is an integer equal to or greater than 2, where a is set to 2 in an 8/16 Modulation Code and a is set to 1 in a 1.7RLL modulation, and where T is a clock cycle, the laser beam operable to form the at least two recording marks with a ratio of the shortest blank region interval to a linear recording velocity equal to or smaller than 20 nsec, with the pulse whose level set to a level corresponding to the recording level is constituted by divided pulses of a number corresponding to a length of the recording mark, and with the power of the laser beam set to the first bottom power between neighboring divided pulses; and an objective lens through which the laser beam is projected onto the optical recording medium to record the data, the objective lens having a numerical aperture (NA) operable to satisfy $\lambda/NA \leq 640$ nm.

5. A method for recording data in a write-once type optical recording medium with at least one recording layer, comprising:

projecting a laser beam onto the write-once type optical recording medium through an objective lens onto the optical recording medium to record the data, the laser beam having a wavelength $\lambda$ equal to or shorter than 450 nm, the objective having with a numerical aperture (NA) that satisfies $\lambda/NA \leq 640$ nm, and a power of the laser beam is modulated by a pulse train pattern including at least a first pulse whose level is set to a recording power and having (n–a) divided pulses when a recording mark having a length nT is formed, where n is an integer equal to or large that 2, where a is set to 2 in an 8/16 Modulation Code and a is set to 1 in a 1.7RLL modulation, and where T is a clock cycle, and including a second pulse whose level is set to a level corresponding to a first bottom power;

forming at least two recording marks in the at least one recording layer by setting a ratio of a shortest blank region interval to a linear recording velocity to be equal to or smaller than 20 nsec; and modulating the power of the laser beam by the pulse train pattern having a third pulse whose level is set to a level corresponding to a second bottom power lower than the first bottom power on at least one of front and rear sides of the pulse whose level is set to the level corresponding to the recording power.

6. The method for recording data in the write-once type optical recording medium in accordance with claim 5, further comprising:

setting the power of the laser beam to the first bottom power between neighboring divided pulses.

7. The method for recording data in the optical recording medium in accordance with claim 1, wherein the numerical aperture NA is greater than or equal to 0.7 such that the wavelength $\lambda$ and the NA satisfy $\lambda/NA \leq 640$ nm.

* * * * *